(12) United States Patent
Shi et al.

(10) Patent No.: US 8,437,397 B2
(45) Date of Patent: May 7, 2013

(54) BLOCK INFORMATION ADJUSTMENT TECHNIQUES TO REDUCE ARTIFACTS IN INTERPOLATED VIDEO FRAMES

(75) Inventors: Fang Shi, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1475 days.

(21) Appl. No.: 11/620,023

(22) Filed: Jan. 4, 2007

(65) Prior Publication Data
US 2008/0165851 A1    Jul. 10, 2008

(51) Int. Cl.
   *H04N 7/36*   (2006.01)
(52) U.S. Cl.
   USPC ............................. 375/240.16; 375/240.27
(58) Field of Classification Search ............. 375/240.16, 375/0.27
   See application file for complete search history.

(56) References Cited

U.S. PATENT DOCUMENTS

| | | | | |
|---|---|---|---|---|
| 4,575,756 | A * | 3/1986 | Furukawa | 348/416.1 |
| 5,113,255 | A * | 5/1992 | Nagata et al. | 348/416.1 |
| 6,487,313 | B1 * | 11/2002 | De Haan et al. | 382/236 |
| 6,618,439 | B1 | 9/2003 | Kuo et al. | |
| 7,003,170 | B1 | 2/2006 | Martucci et al. | |
| 2003/0215011 | A1 | 11/2003 | Wang et al. | |
| 2003/0227977 | A1 * | 12/2003 | Henocq | 375/240.26 |
| 2004/0008899 | A1 * | 1/2004 | Tourapis et al. | 382/251 |
| 2006/0039471 | A1 * | 2/2006 | Dane et al. | 375/240.16 |

FOREIGN PATENT DOCUMENTS

| | | |
|---|---|---|
| EP | 1583364 A1 | 10/2005 |
| GB | 2305569 | 4/1997 |
| WO | WO9957906 A1 | 11/1999 |
| WO | WO02080565 A2 | 10/2002 |
| WO | WO2007/038726 | 4/2007 |
| WO | WO2007038727 | 5/2007 |

OTHER PUBLICATIONS

ISO/IEC 14496-10, Information technology—Coding of audio-visual objects, Part 10: Advanced Video Coding, Second edition Oct. 1, 2004, 280 pages.
ITU-T H.263, Series H: Audiovisual and Multimedia Systems, Infrastructure of audiovisual services—Coding of moving video, Video coding for low bit rate communication, Jan. 2005, 226 pages.

(Continued)

*Primary Examiner* — Sath V Perungavoor
*Assistant Examiner* — Jeffery Williams
(74) *Attorney, Agent, or Firm* — Arent Fox, LLP

(57) ABSTRACT

In general, this disclosure is directed to decoding techniques for interpolating video frames. In particular, this disclosure describes techniques for analyzing block information associated with one or more blocks of pixels and adjusting the block information associated with the block of pixels based on the analysis to reduce artifacts in the interpolated frame. As an example, an interpolation decoder module may analyze and adjust block information associated with one or more blocks of pixels in an interpolated frame. As another example, the interpolation decoder module may adjust block information associated with one or more blocks of pixels in a reference frame that is used for interpolating a skipped video frame. The block information adjustment techniques described in this disclosure may result in a reduction of shaking static background artifacts, blocky artifacts or other types of artifacts in the interpolated frame.

120 Claims, 8 Drawing Sheets

OTHER PUBLICATIONS

ITU-T H.264, Series H: Audiovisual and Multimedia Systems, Infrastructure of audiovisual services—Coding of moving video, Advanced vido coding for generic audiovisual services, Mar. 2005, 343 pages.

ITU-T H.323, Series H: Audiovisual and Multimedia Systems, Infrastructure of audiovisual services—Systems and terminal equipment for audiovisual services, Packet-based multimedia communications systems, Sep. 1999, 131 pages.

ITU-T H.324, Series H: Audiovisual and Multimedia Systems, Infrastructure of audiovisual services—Systems and terminal equipment for audiovisual services, Terminal for low bit-rate multimedia communication, Sep. 2005, 82 pages.

Aho O A et al: "Error Resilience Techniques for MPEG-2 Compressed Video Signal", International Broadcasting Convention, London, GB, No. 397, Sep. 1, 1994, pp. 327-332, XP000934062, DOI: DOI:10.1049/CP:19940770 p. 330, left-hand column, paragraph 3 right-hand column, paragraph 1.

International Search Report and Written Opinion—PCT/US2007/068299—ISA/EPO—May 3, 2011 (060954WO).

* cited by examiner

BLOCK INFORMATION ADJUSTMENT TECHNIQUES TO REDUCE ARTIFACTS IN INTERPOLATED VIDEO FRAMES

TECHNICAL FIELD

This disclosure relates to digital video encoding and decoding and, more particularly, techniques for interpolation of video frames.

BACKGROUND

Digital video capabilities can be incorporated into a wide range of devices, including digital televisions, digital direct broadcast systems, wireless communication devices, personal digital assistants (PDAs), laptop computers, desktop computers, video game consoles, digital cameras, digital recording devices, cellular or satellite radio telephones, and the like. Digital video devices can provide significant improvements over conventional analog video systems in processing and transmitting video sequences.

Different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video encoding standards support improved transmission efficiency of video sequences by encoding data in a compressed manner.

Various video encoding standards support video encoding techniques that utilize similarities between successive video frames, referred to as temporal or Inter-frame correlation, to provide Inter-frame compression. The Inter-frame compression techniques exploit data redundancy across frames by converting pixel-based representations of video frames to motion representations. Frames encoded using Inter-frame techniques are referred to as P ("predictive") frames or B ("bi-directional") frames. Some frames, referred to as I ("intra") frames, are encoded using intra-frame techniques, which are non-predictive.

In order to meet low bandwidth requirements, some video applications, such as video telephony or video streaming, reduce the bit rate by encoding video at a lower frame rate using frame skipping. Unfortunately, the reduced frame rate video can produce artifacts in the form of motion jerkiness. Therefore, frame interpolation, also known as frame rate up conversion (FRUC), can be used at the decoder to interpolate the content of skipped frames, and thereby provide the effect of increased frame rate at the decoder side.

SUMMARY

In general, this disclosure is directed to decoding techniques for interpolating video frames. In particular, this disclosure describes techniques for analyzing block information associated with one or more blocks of pixels in a reference frame or an interpolated frame and adjusting the block information associated with the block of pixels based on the analysis to reduce artifacts in the interpolated frame. The block information adjustment techniques described in this disclosure may result in a reduction of shaking static background artifacts, blocky artifacts or other types of artifacts in the interpolated frame.

As an example, an interpolation decoder module may analyze and adjust block information associated with one or more blocks of pixels in an interpolated frame. For example, the interpolation decoder module may analyze and adjust one or more motion vectors associated with the block of pixels in the interpolated frame. As another example, the interpolation decoder module may analyze and adjust one or more prediction modes associated with blocks of pixels in the interpolated frame.

Alternatively, or additionally, the interpolation decoder module may adjust block information associated with one or more blocks of pixels in a reference frame that is used for interpolating the skipped frame. For example, the interpolation decoder module may generate motion information for one or more intra-coded blocks of pixels in a reference frame.

In one aspect, a method for processing digital video data comprises interpolating a frame of video data based on one or more frames of video data adjacent to the interpolated frame, analyzing block information of the interpolated frame to determine whether to adjust the block information, and adjusting the block information of the interpolated frame based on the analysis to reduce artifacts in the interpolated frame.

In another aspect, an apparatus for processing digital video data comprises an interpolation module that interpolates a frame of video data based on one or more frames of video data adjacent to the interpolated frame, an analysis module that analyzes block information of the interpolated frame to determine whether to adjust the block information, and an adjustment module that adjusts the block information of the interpolated frame based on the analysis to reduce artifacts in the interpolated frame.

In a further aspect, an apparatus for processing digital video data comprises means for interpolating a frame of video data based on one or more frames of video data adjacent to the interpolated frame, means for analyzing block information of the interpolated frame to determine whether to adjust the block information, and means for adjusting block information of the interpolated frame based on the analysis to reduce artifacts in the interpolated frame.

In yet another aspect, a computer program product comprises a computer-readable medium comprising codes for causing at least one computer to interpolate a frame of video data based on at least two decoded frames of video data, analyze block information of the interpolated frame to determine whether to adjust the block information, and adjust the block information of the interpolated frame based on the analysis to reduce artifacts in the interpolated frame.

In another aspect, a processor for processing digital video data is adapted to interpolate a frame of video data based on at least two decoded frames of video data, analyze block information of the interpolated frame to determine whether to adjust the block information and adjust the block information of the interpolated frame based on the analysis to reduce artifacts in the interpolated frame.

In another aspect, a method for processing digital video data comprises identifying an intra-coded block of pixels in a reference frame of video data and generating motion information for the intra-coded block of pixels.

In a further aspect, an apparatus for processing digital video data comprises a frame adjustment module that identifies an intra-coded block of pixels in a reference frame of video data and generates motion information for the intra-coded block of pixels and an interpolation module that interpolates a block of pixels of a skipped video frame using the motion information associated with the intra-coded block of pixels.

In yet another aspect, an apparatus for processing digital video data comprises means for identifying an intra-coded block of pixels in a reference frame of video data and means for generating motion information for the intra-coded block of pixels.

In another aspect, a computer program product comprises a computer-readable medium comprises codes for causing at least one computer to identify an intra-coded block of pixels in a reference frame of video data and generate motion information for the intra-coded block of pixels.

In a further aspect, a processor for processing digital video data is adapted to identify an intra-coded block of pixels in a reference frame of video data and generate motion information for the intra-coded block of pixels.

The techniques described in this disclosure may be implemented in hardware, software, firmware, or any combination thereof. If implemented in software, the software may be executed in a computer. The software may be initially stored as instructions, program code, or the like. Accordingly, the disclosure also contemplates a computer program product for digital video encoding comprising a computer-readable medium, wherein the computer-readable medium comprises codes for causing a computer to execute techniques and functions in accordance with this disclosure.

The details of one or more aspects of the disclosure are set forth in the accompanying drawings and the description below. Other features, objects, and advantages of the disclosure will be apparent from the description and drawings, and from the claims.

DETAILED DESCRIPTION

Various aspects of the disclosure are described below. It should be apparent that the teachings herein may be embodied in a wide variety of forms and that any specific structure or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure or functionality in addition to or other than one or more of the aspects set forth herein. Thus, an apparatus may be implemented or a method may be practiced by using one or more of the block information adjustment techniques disclosed herein to reduce artifacts in an interpolated frame.

In general, this disclosure is directed to decoding techniques for interpolation of video frames. In particular, this disclosure describes techniques for analyzing block information associated with one or more blocks of pixels and adjusting the block information associated with the block of pixels based on the analysis to reduce artifacts in the interpolated frame. The block information adjustment techniques described in this disclosure may result in a reduction of shaking static background artifacts, blocky artifacts or other types of artifacts in the interpolated frame.

As an example, an interpolation decoder module may analyze and adjust block information associated with one or more blocks of pixels in an interpolated frame. For example, the interpolation decoder module may analyze and adjust one or more motion vectors associated with the block of pixels in the interpolated frame. As another example, the interpolation decoder module may analyze and adjust one or more prediction modes associated with blocks of pixels in the interpolated frame.

Alternatively, or additionally, the interpolation decoder module may adjust block information associated with one or more blocks of pixels in a reference frame that is used for interpolating the skipped frame. For example, the interpolation decoder module may generate motion information for one or more intra-coded blocks of pixels in a reference frame.

Figure 1:
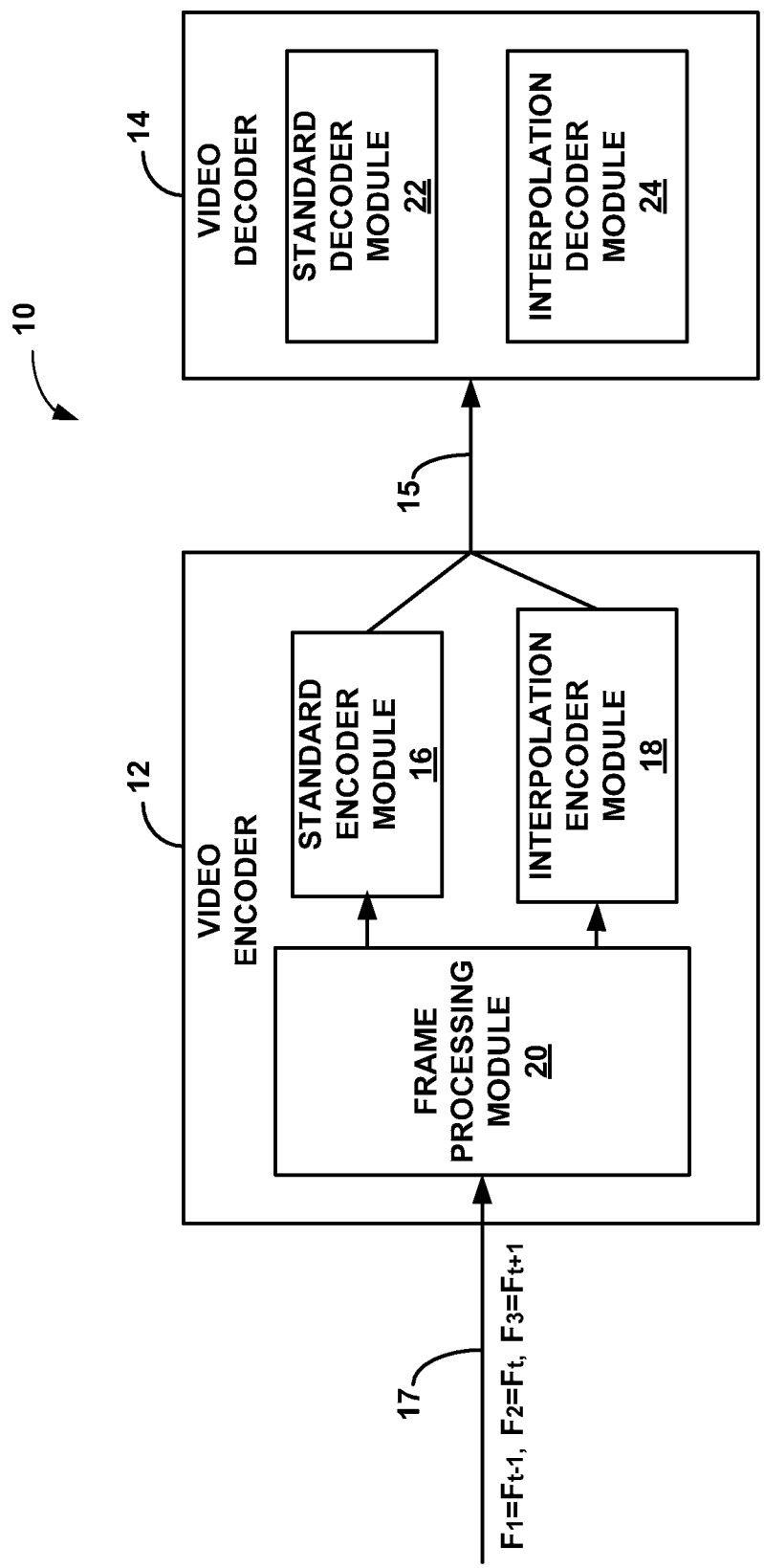
FIG. 1 is a block diagram illustrating a video encoding and decoding system employing block information adjustment techniques in accordance with this disclosure to reduce artifacts in interpolated frames.

FIG. 1 is a block diagram illustrating a video encoding and decoding system 10 employing block information adjustment techniques in accordance with this disclosure to reduce artifacts in interpolated frames. As shown in FIG. 1, system 10 includes a video encoder 12 and a video decoder 14 connected by a transmission channel 15. Encoded multimedia sequences, such as video sequences, may be transmitted from encoder 12 to decoder 14 over transmission channel 15. Transmission channel 15 may be a wired or wireless medium. System 10 may support bi-directional video transmission, e.g., for video telephony. Accordingly, reciprocal encoding and decoding components may be provided on opposite ends of channel 15. Alternatively, system 10 may support broadcasting and video encoder may form part of a video broadcast device that broadcasts or streams video to one or more subscriber devices over a wired or wireless media. In various aspects, encoder system 12 and decoder system 14 may be embodied within video communication devices such as a digital television, a wireless communication device, a gaming device, a portable digital assistant (PDA), a laptop computer or desktop computer, a digital music and video device, such as those sold under the trademark "iPod," or a radiotelephone such as cellular, satellite or terrestrial-based radiotelephone, or other wireless mobile terminals equipped for video streaming, video telephony, or both.

In some aspects, for two-way communication, system 10 may support video telephony of video streaming according to the Session Initiated Protocol (SIP), ITU-T H.323 standard, ITU-T H.324 standard, or other standards. Video encoder 12 generates encoded video data according to a video compression standard, such as MPEG-2, MPEG-4, ITU-T H.263, or ITU-T H.264. Although not shown in FIG. 1, video encoder 12 and video decoder 14 may be integrated with an audio encoder and decoder, respectively, and include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In some aspects, this disclosure contemplates application to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). The FLO Specification includes examples defining bit stream syntax and semantics and decoding processes suitable for delivering services over the FLO Air Interface. However, the frame interpolation techniques described in this disclosure are not limited to any particular type of broadcast, multicast system, or point-to-point system.

Video encoder 12 and video decoder 14 may be implemented as one or more processors, digital signal processors, application specific integrated circuits (ASICs), field programmable gate arrays (FPGAs), discrete logic, software, hardware, firmware or any combinations thereof. The illustrated components of video encoder 12 and video decoder 14 may be included in one or more encoders or decoders, either of which may be integrated as part of a combined encoder/decoder (CODEC) in a respective subscriber device, broadcast device, server, or the like. In addition, video encoder 12 and video decoder 14 may include appropriate modulation, demodulation, frequency conversion, filtering, and amplifier components for transmission and reception of encoded video, including radio frequency (RF) wireless components and antennas, as applicable. For ease of illustration, however, such components are not shown in FIG. 1.

Video encoder 12 receives an input multimedia sequence 17 and selectively encodes the multimedia sequence 17. Multimedia sequence 17 may be a live real-time video or video and audio sequence that is captured by a video source (not shown). Alternatively, multimedia sequence may be a pre-recorded and stored video or video and audio sequence. In either case, encoder 12 encodes and transmits a plurality of video frames to decoder 14. The plurality of video frames may include one or more intra ("I") frames that are encoded using intra-encoding techniques, i.e., without reference to other frames. The plurality of video frames may also include one or more frames that are encoded using inter-frame techniques, such as predictive ("P") frames that are encoded with reference to temporally prior frames and/or bi-directional ("B") frames that are encoded with respect to temporally prior and future frames. The encoded frames include sufficient information to permit video decoder 14 to decode and present a frame of video information. Encoder 12 may encode the frames to include one or more motion vectors, quantized prediction errors, block encoding modes, and the like.

Video encoder 12 may encode the video information at a reduced frame rate using frame skipping to conserve bandwidth across transmission channel 15. To encode video information at a reduced frame rate, encoder 12 may skip particular frames (referred to as skipped ("S") frames) according to a frame skipping function designed to reduce the overall amount of encoded information for bandwidth conservation across transmission channel 15. In other words, encoder 12 does not actually encode and transmit the S frames. Instead, video decoder 14 interpolates the skipped frames using one or more of the transmitted frames to produce a frame of video information. This interpolation process has the effect of increasing the apparent frame rate of the video decoded by decoder 15, and is often referred to as frame rate up-conversion (FRUC).

In the example of FIG. 1, video encoder 12 includes a frame processing module 20 and a standard encoder module 16. Frame processing module 20 is configured to process incoming frames of video information, such as frames $F_1$, $F_2$ and $F_3$. Based on analysis of incoming frames $F_1$, $F_2$ and $F_3$, frame processing module 20 determines whether to encode or skip the incoming frames. In the example of FIG. 1, $F_2$ represents the frame to be skipped, while frames $F_1$ and $F_3$ represent the previous and subsequent frames, respectively, which will be encoded and transmitted to video decoder 14. Although in the example illustrated in FIG. 1 frame processing module 20 skips every other frame, frame processing module 20 may be configured to skip every nth frame or include a dynamic skipping criteria that may be applied to dynamically select frames to be skipped. For the incoming frames that will be encoded, frame processing module 20 may also be configured to determine whether to encode the frames as I frames, P frames or B frames.

Frame processing module 20 may be further configured to partition a frame into N blocks of pixels and encode each of the blocks of pixels separately. As an example, frame processing unit 20 may partition the frame in a plurality of 16×16 blocks of pixels. Some blocks of pixels, often referred to as "macroblocks," comprise a grouping of sub-blocks of pixels. As an example, a 16×16 macroblock may comprise four 8×8 sub-blocks. The sub-blocks may be encoded separately. For example, the H.264 standard permits encoding of blocks with a variety of different sizes, e.g., 16×16, 16×8, 8×16, 8×8, 4×4, 8×4, and 4×8. Frame processing module 20 may be configured to divide the frame into several blocks or macroblocks and determine whether to encode the blocks as I-frames, P-frames or B-frames. Often, frame processing module 20 may determine to encode blocks within the same frame using different encoding techniques. In other words, frame processing unit 20 may determine to encode some blocks of pixels as I-frames using intra-coding techniques and other blocks of pixels as P-frames or B-frames using inter-coding techniques.

Standard encoding module 16 applies standard encoding techniques, such as motion estimation and motion compensation, to encode frames or blocks of pixels in the frame selected by frame processing module 20 for encoding, e.g., frames $F_1$ and $F_3$. Standard encoding module 16 may also apply non-motion coding techniques such as spatial estimation and intra-prediction for some of the frames or blocks of pixels. According to standard predictive-based techniques, standard encoding module 16 may also include various units for entropy encoding, scanning, quantization, transformation, and possibly deblock filtering.

In some aspects, video encoder 12 may additionally include an interpolation encoder module 18. Interpolation encoder module 18 may generate and encode information associated with the skipped frames to assist decoder 14 in interpolating the skipped frames. Interpolation encoder module 18 may generate and transmit, for example, motion information for one or more skipped frames or one or more blocks of pixels within the skipped frame, information identifying a prediction mode used for encoding the blocks in the skipped frame, and the like. Interpolation encoder module 18 may transmit the encoded information associated with the skipped frames to video decoder 14 in a dedicated frame or in one or more transmitted video frames, such as frame $F_1$ or $F_3$. In this manner, video encoder 12 may be configured, in some aspects, to generate and transmits information associated with the skipped frame to assist video decoder 14 in interpolating the skipped frame. However, the techniques described in this disclosure may not require assistance from video encoder 12. Thus, in some aspects, video encoder 12 may not include an interpolation encoder module 18. In this case, video decoder 14 performs interpolation without the assistance of video encoder 12.

Video decoder 14 receives the encoded video frames from video encoder 12 and decodes the video frames. Video decoder 14 may be specially configured to recognize and make use of the encoded information associated with the skipped frames that is transmitted by video encoder 12. If video decoder 14 is not equipped to recognize and make use of the encoded information associated with the skipped frames, however, the information can be ignored, and interpolation can proceed according to interpolation techniques otherwise applied by video decoder 14. Also, if no such information associated with skipped frames is sent by video encoder 12, interpolation can proceed according to interpolation techniques otherwise applied by video decoder 14. For example, video decoder 14 may generate block information for the skipped frame $F_2$ when video decoder 14 using block information obtained from one or more previous or subsequent frames $F_1$ and $F_3$.

Video decoder 14 includes a standard decoder module 22 and an interpolation decoder module 24. Standard decoder module 22 and interpolation decoder module 24 need not be separate components, and instead may be integrated as separate processes within a common CODEC, making use of multiple components on a shared basis. Standard decoder module 22 applies standard decoding techniques to decode each encoded frame, such as frames $F_1$ and $F_3$, sent by encoder 12. As described above, the information encoded in each frame is sufficient to permit standard decoder module 22 to decode and present a frame of video information.

Interpolation decoder module 24 interpolates skipped video frames, such as frame $F_2$. Interpolation decoder module 24 interpolates the skipped video frame based on one or more reference frames of video data, such as $F_1$, $F_3$ or both. In other words, interpolation decoder module 24 may use encoded information associated with one or more reference video frames to interpolate the skipped video frames. As an example, interpolation decoder module 24 may apply motion information associated with one or more of reference frames to interpolate the skipped frame. Moreover, interpolation decoder module 24 may be further configured to use encoded information associated with the skipped frame in addition to the information associated with the reference frame or frames to interpolate skipped video frames.

As described above, encoder 12 and decoder 14 may operate in a block-based mode by dividing frames into a plurality of blocks of pixels. Thus, interpolation decoder module 24 generates block information for one or more of the blocks of pixels in the skipped video frame using interpolation based on one or more corresponding blocks of pixels in the reference frame or frames. In accordance with the techniques described in this disclosure, interpolation decoder module 24 may adjust block information associated with one or more blocks of pixels in a frame to reduce artifacts in the interpolated frame. Interpolation decoder module 24 may, for example, adjust block information associated with one or more blocks of pixels in the interpolated frame. Alternatively, or additionally, interpolation decoder module 24 may adjust block information associated with one or more blocks of pixels in a reference frame that is used for interpolating the skipped frame. The block information adjustment techniques described in this disclosure may result in a reduction of shaking static background artifacts, blocky artifacts or other types of artifacts in the interpolated frame.

As an example, interpolation decoder module 24 may adjust motion vectors associated with one or more blocks of pixels in the interpolated frame to reduce artifacts in the interpolated frame. In a first block information adjustment technique, interpolation decoder module 24 adjusts motion vectors associated with a block of pixels that includes both moving and static content to treat the block of pixels as though the entire block only contained static content. In the case of a 16×16 macroblock of pixels that includes four 8×8 sub-blocks of pixels that each correspond to a motion vector, for example, interpolation decoder module 24 may set the motion vectors associated with the sub-blocks to zero when at least two motion vectors are significantly different, e.g., a difference between the motion vectors exceeds a threshold. In this manner, interpolation decoder module 24 treats the entire block of pixels as though the entire block of pixels contained static content, thus suppressing shaking static background artifacts in the interpolated frame.

In another block information adjustment technique, interpolation decoder module 24 reduces static boundary shaking by setting motion vectors associated with pixels that correspond to a boundary of an image to zero. The boundary may, for example, be a two or three pixel wide margin at the sides, top and/or bottom of the image. In particular, interpolation decoder module 24 identifies a boundary of a portion of an image associated with a block of pixels in the interpolated frame and associates a motion vector corresponding to the block of pixels only with pixels of the block that do not correspond to the boundary. Interpolation decoder module 24 may associate a zero motion vector with the pixels of the block that correspond to the boundary, thus reducing the shaking static boundary artifacts in the interpolated image.

In a further block information adjustment technique, interpolation decoder module 24 removes motion vectors that are identified to be motion noise. In particular, interpolation decoder module 24 compares motion vectors associated with a plurality of blocks of pixels that form a region in the interpolated frame to a threshold magnitude and sets the motion vectors associated with the blocks in the region equal to zero if at least a majority of the motion vectors associated with the blocks in the region are below the threshold.

Alternatively, or additionally, interpolation decoder module 24 may adjust prediction modes associated with one or more blocks of pixels of the interpolated frame to reduce artifacts in the interpolated frame. In another block information adjustment technique, interpolation decoder module 24 adjusts the prediction mode associated with one or more blocks of pixels in a region so that all the blocks of pixels in the region have the same prediction mode. For example, if a majority of the blocks of pixels belonging to a region are in a bi-directional prediction mode, interpolation decoder module 24 changes the prediction mode associated with any blocks of pixels that correspond to a uni-directional prediction mode (i.e., either forward prediction or backward prediction) from the uni-directional mode to bi-directional mode.

In another aspect of this disclosure, interpolation decoder module 24 may adjust block information associated with blocks of pixels in one or more reference frames instead of the interpolated frames to reduce artifacts in the interpolated frame. As an example, interpolation decoder module 24 may identify blocks of pixels in one or more reference frames that were encoded using intra-coding techniques and generate motion information for the intra-coded blocks of pixels. By associating motion information with the intra-coded blocks of pixels in the reference frame, blocks of pixels in the interpolate frame that reference the intra-coded blocks of pixels will have reduced artifacts.

The foregoing techniques may be implemented individually, or two or more of such techniques, or all of such techniques, may be implemented together in interpolation decoder module 24. A number of other elements may also be included encoding and decoding system 10, but are not specifically illustrated in FIG. 1 for simplicity and ease of illustration. The architecture illustrated in FIG. 1 is merely exemplary, as the techniques described herein may be implemented with a variety of other architectures. Moreover, the features illustrated in FIG. 1 may be realized by any suitable combination of hardware and/or software components.

Figure 2:
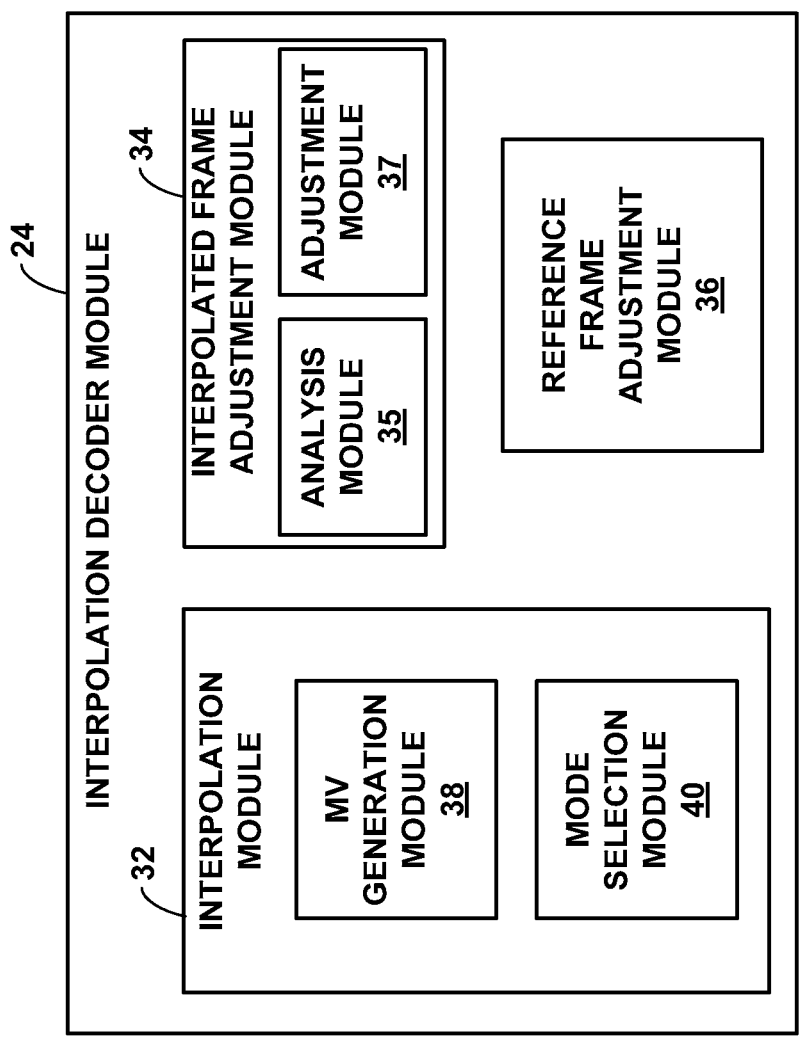
FIG. 2 is a block diagram illustrating an exemplary interpolation decoder module for use in a video decoder.

FIG. 2 is a block diagram illustrating an exemplary interpolation decoder module 24 for use in a video decoder, such as video decoder 14 of FIG. 1. Interpolation decoder module 24 includes an interpolation module 32, an interpolated frame adjustment module 34 and a reference frame adjustment module 36 that operate together to produce an interpolated frame. As described above, interpolation decoder module 24 adjusts block information associated with one or more blocks of pixels of a reference frame or an interpolated frame in accordance with one or more of the techniques of this disclosure to reduce artifacts in the interpolated frame.

In particular, interpolation module 32 interpolates a frame of video data based on one more reference frames. For example, interpolation module 32 may interpolate the frame of video data based on a previous reference frame, a subsequent reference frame, both a previous and subsequent reference frame, or more than two reference frames. As described above, interpolation module 32 may interpolate the frame of video data in a block-based mode. In other words, interpolation module 32 may divide the frame into a plurality of blocks of pixels (e.g., macroblocks of 16×16 pixels) and interpolate each of the blocks of pixels based on corresponding blocks of pixels in the reference frame. In this manner, interpolation module 32 generates block information for each block of pixels based on block information of one or more reference frames. The block information for each block of pixels may include motion information, e.g., in the form of one or more motion vectors, a prediction mode and residual information.

Interpolation module 32 includes a motion vector generation module (labeled "MV generation module" in FIG. 2) 38 and a mode selection module 40. Motion vector generation module 38 generates motion information, e.g., motion vectors, for the skipped video frame using motion information associated with one or more video frames adjacent to the skipped video frame. When operating in a block-based mode, motion vector generation module 38 generates motion information for each of the blocks of pixels within the skipped frame based on one or more motion vectors associated with corresponding blocks of pixels in one or more reference frames. As an example, motion vector generation module 40 may generate a forward motion vector and a backward motion vector for each of the blocks of pixels of the skipped frame.

Mode selection module 40 determines a prediction mode for each of the blocks of pixels of the skipped frame. Mode selection module 40 may, for example, select one of three prediction modes for each of the blocks of pixels of the skipped frame. Mode selection module 40 may select between a forward prediction mode that uses a previous reference frame to interpolate the block, a backward prediction mode that uses the subsequent/current reference frame to interpolate the block, or a bi-directional prediction mode that uses both the previous and subsequent/current frame to interpolate the block. Mode selection module 40 may determine the prediction mode for the block based on a distortion metric associated with each motion vector, such as a Sum of Absolute Differences (SAD) value. For example, mode selection module 40 may select the prediction mode for the block by selecting the prediction mode that uses the motion vector that has a minimum distortion metric. Alternatively, or additionally, mode selection module 40 may select a prediction mode based on the alignment of the forward and backward motion vectors. For example, mode selection module 40 may select bi-directional prediction mode if the two motion vectors are substantially aligned.

Interpolated frame adjustment module 34 analyzes the block information associated with one or more blocks of pixels of the interpolated frame, and adjusts the block information associated with one or more blocks of pixels of the interpolated frame to reduce artifacts in the interpolated frame based on the analysis. Interpolated frame adjustment module 34 may utilize one or more of the several techniques described in this disclosure to adjust the block information of the interpolated frame to reduce artifacts in the interpolated frame. For example, interpolated frame adjustment module 34 may analyze and adjust one or more motion vectors or one or more prediction modes associated with the blocks of pixels of the interpolated frame. In the example illustrated in FIG. 2, interpolated frame adjustment module 34 includes an analysis module 35 that analyzes the block information associated with one or more blocks of pixels of the interpolated frame, and an adjustment module 37 that adjusts the block information associated with one or more blocks of pixels of the interpolated frame to reduce artifacts in the interpolated frame based on the analysis In a first block information adjustment technique, interpolated frame adjustment module 34 may treat a block of pixels that includes both moving and static content as if the block only contained static content to reduce shaking static background artifacts. In particular, interpolated frame adjustment module 34 analyzes a plurality of motion vectors associated with the block of pixels to determine a content of the block. As an example, the block of pixels may comprise a 16×16 macroblock of pixels that includes four 8×8 sub-blocks of pixels that each have a corresponding motion vector. Interpolated frame adjustment module 34 compares the motion vectors associated with the sub-blocks of pixels and determines that the macroblock includes both moving and static content when the motion vector associated with one of the sub-blocks is significantly different than the motion vector associated with another one of the sub-blocks. Interpolated frame adjustment module 34 may determine that two motion vectors are significantly different when the difference between the magnitudes of the motion vectors exceeds a magnitude threshold. Alternatively, interpolated frame adjustment module 34 may determine that two motion vectors are significantly different when the difference between the directions of two motion vectors exceeds a directional threshold.

Upon determining that the macroblock includes both moving and static content, interpolated frame adjustment module 34 adjusts the motion vectors associated with the sub-blocks of pixels to treat the entire macroblock as if it contained only static content. Interpolated frame adjustment module 34 may, for example, set the motion vectors associated with each of the sub-blocks to zero. Likewise, interpolated frame adjustment module 34 adjusts the motion vectors associated with the sub-blocks of pixels to treat the entire macroblock as if contained only static content upon determining that the difference between the directions of two or more motion vectors exceeds a directional threshold. Because the human eye is more sensitive to movement of static content than to slightly irregular movement of moving content, treating the entire macroblock as a static object results in a more pleasurable viewing experience to the viewer of the video content.

In another block information adjustment technique, interpolated frame adjustment module 34 reduces static boundary shaking by associating motion vectors associated with the block of pixels only with the pixels of the block that do not correspond to the boundary. In particular, interpolated frame adjustment module 34 identifies a boundary of an image within a block of pixels in the interpolated frame. The boundary may, for example, be a two or three pixel wide black or white boundary that runs along the edges of a frame. Accordingly, a given macroblock may include boundary and non-boundary pixels.

Interpolated frame adjustment module 34 may detect a boundary within the portion of the image associated with the block of pixels in the interpolated frame by detecting a boundary within a corresponding block of pixels in a reference frame. Interpolated frame adjustment module 34 may, for example, identify the boundary of the portion of the image based on the reconstructed pixel values of one or more reference frames. Interpolated frame adjustment module 34 may detect pixels corresponding to the boundary in a row by row or column by column manner. Analysis module 35 may, for example, scan the row in a raster scan order pixel by pixel, and compare a luma value associated with each pixel with a color threshold. If the luma value associated with a pixel is below the color threshold, analysis module 35 marks the pixel as black pixel. After analysis module 35 scans an entire row, analysis module compares the percentage of black pixels to a confidence threshold, and if the percentage of black pixels is above the confidence threshold, analysis module 35 marks the row as black row, i.e., associated with a boundary. Analysis module 35 may perform the same comparison for neighboring rows. The set of consecutive black rows are identified as a black boundary. A similar analysis may be performed on a column by column basis Interpolated frame adjustment module 34 associates the motion vector associated with the block of pixels only to the pixels of the block that do not correspond to the boundary. Interpolated frame adjustment module 34 associates a zero motion vector with the pixels of the block that correspond to the boundary, thus reducing the shaking static boundary artifacts of the border in the interpolated image. In one example, interpolated frame adjustment module 34 shifts the motion vector associated with the block of pixels of the interpolated video frame to associate the motion vector with only the pixels of the block that do not correspond to the boundary.

In a further block information adjustment technique, interpolated frame adjustment module 34 removes motion vectors that are identified as motion noise. In particular, interpolated frame adjustment module 34 compares motion vectors associated with a plurality of blocks of pixels of a region in the interpolated frame to a threshold magnitude. Interpolated frame adjustment module 34 may group a plurality of blocks of pixels to form the region. Interpolated frame adjustment module 34 may, for example, group blocks of pixels to form a three block by three block region. Interpolated frame adjustment module 34 may also try to group blocks of pixels that have substantially similar motion vectors.

Interpolated frame adjustment module 34 adjusts the block information associated with one or more of the blocks of pixels based on the comparison. In particular, interpolated frame adjustment module 34 sets the motion vectors of the region equal to zero if at least a majority of the motion vectors of the region are below the threshold magnitude. This technique may be particularly effective to reduce artifacts in interpolated frames in a high motion sequence. If the majority of the motion vectors of a high motion sequence are below the threshold magnitude, it may be an indication that the small motion vectors are simply motion noise and therefore should be treated as if there was no motion.

In yet another block information adjustment technique, interpolated frame adjustment module 34 adjusts the prediction mode of one or more blocks of pixels in a region so that all the blocks of pixels in the region have the same prediction mode. As described above, mode decision module 40 selects a prediction mode, e.g., forward prediction, backward prediction or bi-directional prediction, for each of the blocks of pixels. Interpolated frame adjustment module 34 compares a prediction mode associated with a block of pixels in the interpolated frame with a prediction mode associated with a region in the interpolated frame to which the block belongs, and changes the prediction mode associated with the block of pixels to the prediction mode of the region if the prediction mode associated with the block is different than the prediction mode of the region. For example, if the prediction mode of the majority of the blocks of pixels belonging to the region is bi-directional prediction, interpolated frame adjustment module 34 changes the prediction mode of any blocks of pixels that correspond to a uni-directional prediction mode (i.e., either forward prediction or backward prediction) from the uni-directional mode to bi-directional mode. In this manner, interpolated frame adjustment module 34 reduces block artifacts in the interpolated frame by changing the prediction mode of blocks of pixels with outlier prediction modes.

In another aspect of this disclosure, interpolation decoder module 24 includes a reference frame adjustment module 36 that adjusts block information associated with blocks of pixels in one or more reference frames instead of the interpolated frames to reduce artifacts in the interpolated frame. As an example, reference frame adjustment module 36 may identify blocks of pixels in one or more reference frames that are encoded using intra-coding techniques and generate motion information for the intra-coded blocks of pixels. Typically, the intra-coded blocks of pixels of the reference frame do not include associated motion information. Blocky artifacts in the interpolated frame may, however, occur when blocks of pixels of the interpolated frame reference the intra-coded blocks of pixels in the reference frame that do not include motion information or are associated with a zero motion vector. To reduce these blocky artifacts, reference frame adjustment module 36 may generate motion information for the intra-coded blocks of pixels of the reference using motion information associated with one or more blocks of pixels that neighbor the intra-coded block of pixels. The adjusted block information of the reference frames is then used by interpolation module 32 to generate motion vectors and select prediction modes for the skipped frame.

A number of other elements may also be included in interpolation decoder module 24, but are not specifically illustrated in FIG. 2 for simplicity and ease of illustration. For example, interpolation decoder module 24 may include a post-processing module that performs other post-processing operations on the interpolated frame, such as de-blocking filtering or other similar operations. The various components illustrated in FIG. 2 may be realized in hardware, software, firmware, or any combination thereof. Some components may be realized as processes or modules executed by one or more microprocessors or digital signal processors (DSPs), one or more application specific integrated circuits (ASICs), one or more field programmable gate arrays (FPGAs), or other equivalent integrated or discrete logic circuitry. Depiction of different features as modules is intended to highlight different functional aspects of interpolation decoder module 24 and does not necessarily imply that such modules must be realized by separate hardware and/or software components. Rather, functionality associated with one or more modules may be integrated within common or separate hardware and/or software components. Thus, the disclosure should not be limited to the example of interpolation decoder module 24.

When implemented in software, the functionality ascribed to the systems and devices described in this disclosure may be embodied as instructions on a computer-readable medium, such as within a memory (not shown), which may comprise, for example, random access memory (RAM), read-only memory (ROM), non-volatile random access memory (NVRAM), electrically erasable programmable read-only memory (EEPROM), FLASH memory, magnetic or optical data storage media, or the like. The instructions are executed to support one or more aspects of the functionality described in this disclosure.

Figure 3:
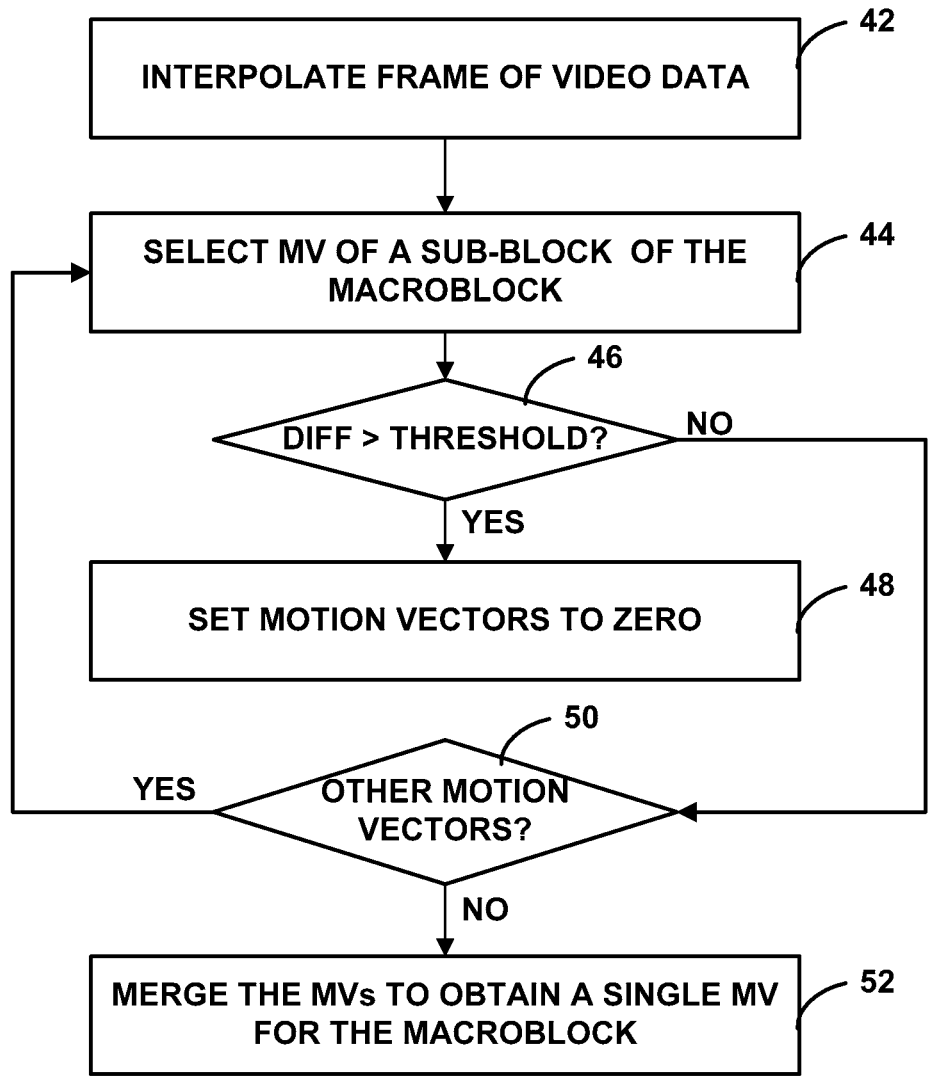
FIG. 3 is a flow diagram illustrating exemplary operation of an interpolation decoder module adjusting block information of one or more blocks of pixels of an interpolated frame to treat a block of pixels that includes both moving and static content as if the block only contained static content.

FIG. 3 is a flow diagram illustrating exemplary operation of an interpolation decoder module, such as interpolation decoder module 24 of FIGS. 1 and 2, adjusting block information of one or more blocks of pixels of an interpolated frame to treat a block of pixels that includes both moving and static content as if the block only contained static content.

Initially, interpolation decoder module 24 interpolates a frame of video data based on one or more reference frames (42). As described above, interpolation decoder module 24 may interpolate the frame of video data in a block-based mode by dividing the skipped frame into a plurality of blocks of pixels and interpolating each of the blocks of pixels based on corresponding blocks of pixels in the reference frame or frames. For example, interpolation decoder module 24 may interpolate the skipped frame to generate block information for each of the blocks of pixels that includes one or more motion vectors, a prediction mode, residual information and the like. As described above, one or more blocks of pixels may be grouped to form a macroblock. For example, four 8×8 blocks of pixels that are each associated with a respective motion vector may be grouped into one 16×16 macroblock that includes four motion vectors. The example operation described in FIG. 3 will be described in terms of a 16×16 macroblock with four 8×8 sub-blocks for exemplary purposes. The techniques described are equally applicable to macroblocks of differing sizes. For example, the techniques may also be used to determine the content of a block of pixels in which more than one of the pixels has an associated motion vector.

Interpolation decoder module 24 selects a motion vector associated with one of the sub-blocks of pixels of the macroblock (44). Interpolation decoder module 24 computes a difference between the selected motion vector and one or more motion vectors associated with other sub-blocks of the macroblock to determine whether any of the differences exceeds a threshold (46). If any of the differences between the selected motion vector and the motion vectors associated with the other sub-blocks exceeds a threshold, which indicates that the macroblock includes both moving and static content, interpolation decoder module 24 sets the motion vectors of the macroblock to zero (48). In this manner, interpolation decoder module 24 treats the macroblock as though the content of the entire macroblock is static, thus reducing artifacts in the interpolated frame.

If none of the differences between the motion vector associated with the selected sub-block and the motion vectors associated with the other sub-blocks exceeds the threshold, interpolation decoder module 24 determines that the macroblock includes both static and non-static content. Setting the motion vectors associated with the macroblock to zero reduces shaking static background artifacts in the interpolated image.

If none of the differences between the motion vector associated with the selected sub-block and the motion vectors associated with the other sub-blocks exceeds the threshold, an indication that the macroblock does not include both static and non-static (i.e., moving) content, interpolation decoder module 24 determines whether there are any more motion vectors associated with sub-blocks that have yet to be analyzed (50). If there are more motion vectors associated with sub-blocks that have not been analyzed, interpolation decoder module 24 selects the next motion vector associated with another one of the sub-blocks and computes differences between the selected motion vector and the motion vectors associated with the other sub-blocks of the macroblock. Interpolation decoder module 24 continues to analyze the motion vectors of the macroblock until the motion vectors associated with all the sub-blocks have been analyzed or the difference between two of the motion vectors exceeds the threshold.

If there are no motion vectors associated with other sub-blocks that have yet to be analyzed and none of the computed differences between motion vectors exceeded the threshold, interpolation decoder module 24 may merge the motion vectors associated with the plurality of sub-blocks to obtain a single motion vector associated with the entire macroblock (52). Thus, if the macroblock does not contain static content and non-static content, interpolation decode module 24 may generate a single motion vector representative of the motion field for the entire macroblock.

Figure 4:
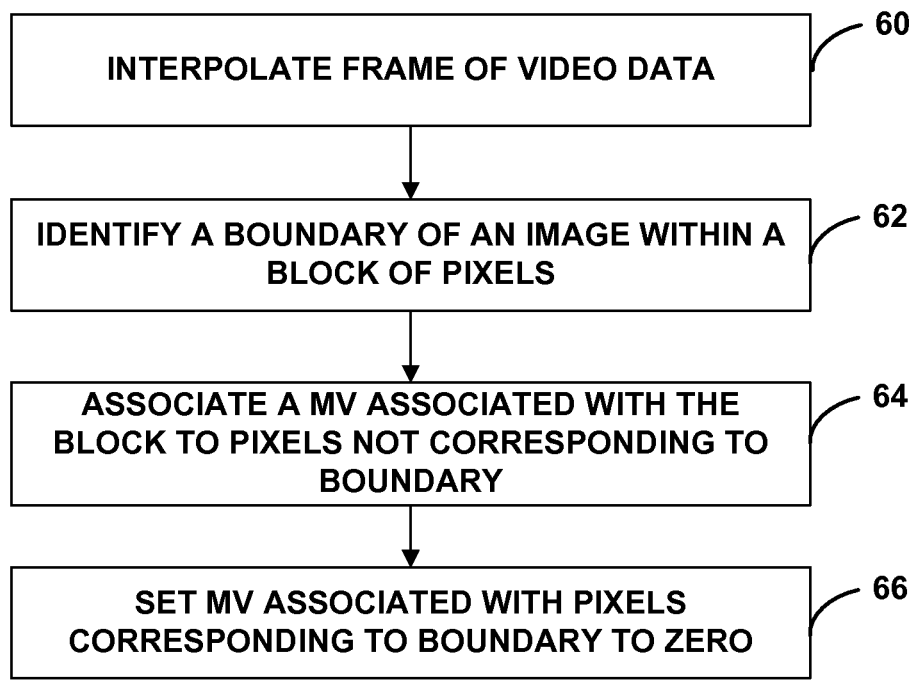
FIG. 4 is a flow diagram illustrating exemplary operation of an interpolation decoder module associating a motion vector associated with a block of pixels only with pixels of the block that do not correspond to an identified boundary.

FIG. 4 is a flow diagram illustrating exemplary operation of an interpolation decoder module, such as interpolation decoder module 24 of FIGS. 1 and 2, associating a motion vector associated with a block of pixels only with pixels of the block that do not correspond to an identified boundary. Initially, interpolation decoder module 24 interpolates a frame of video data based on one or more reference frames (60). In particular, interpolation decoder module 24 may interpolate the frame of video data in a block-based mode by dividing the skipped frame into a plurality of blocks of pixels and interpolating each of the blocks of pixels based on corresponding blocks of pixels in the reference frame or frames.

Interpolation decoder module 24 identifies a boundary of an image within one of the blocks of pixels of the interpolated vide frame (62). The boundary may be a black or white boundary along the edges of the picture. For a display with Quarter Video Graphics Array (QVGA) resolution, for example, the video clip may have a black or white boundary along both sides as well as along the top and bottom of the image that is approximately one to three pixels wide. Thus, the pixels that correspond with the edge of the image may include rows or columns of pixels that correspond with the boundary. In the case of a boundary that is two pixels wide, for instance, blocks of pixels that include the boundary may have two columns of pixels that correspond to the boundary (in the case of the boundary being along the sides of the image) or two rows of pixels that correspond to the boundary (in the case of the boundary being along the top or bottom of the image).

Interpolation decoder module 24 may identify a boundary within the portion of the image associated with the block of pixels in the interpolated frame by detecting a boundary within a corresponding block of pixels in a reference frame and associating the boundary in the block of pixels of the reference frame to the corresponding block of pixels of the interpolated frame. Interpolated frame adjustment module 34 may, for example, identify the boundary of the portion of the image based on the reconstructed pixel values of one or more reference frames.

Interpolation decoder module 24 associates a motion vector associated with the block of pixels to the pixels of the block that do not correspond to the boundary (64). In other words, interpolation decoder module 24 associates the motion vector associated with the block of pixels with all the pixels of the block except for those pixels along the edge of the image that correspond to the boundary. For example, if a 16×16 block of pixels includes a boundary that corresponds to the last two columns of pixels of the block, interpolation decoder module 24 associates the motion vector associated with the block to the pixels of the first fourteen columns of pixels, but not with the last two columns of pixels. In one aspect, interpolated decoder module 24 shifts the motion vector associated with the block of pixels of the interpolated video frame to associate the motion vector with only the pixels of the block that do not correspond to the boundary.

Interpolation decoder module 24 sets the motion vector associated with the pixels of the block that correspond to the boundary to zero (66). In the example above, interpolation decoder module 24 sets the motion vectors associated with the pixels of the last two columns of pixels equal to zero. In this manner, interpolation decoder module 24 does not perform motion compensation to the pixels of the block that correspond to the boundary of the image, thus reducing the shaking static boundary artifacts in the interpolated image.

Figure 5:
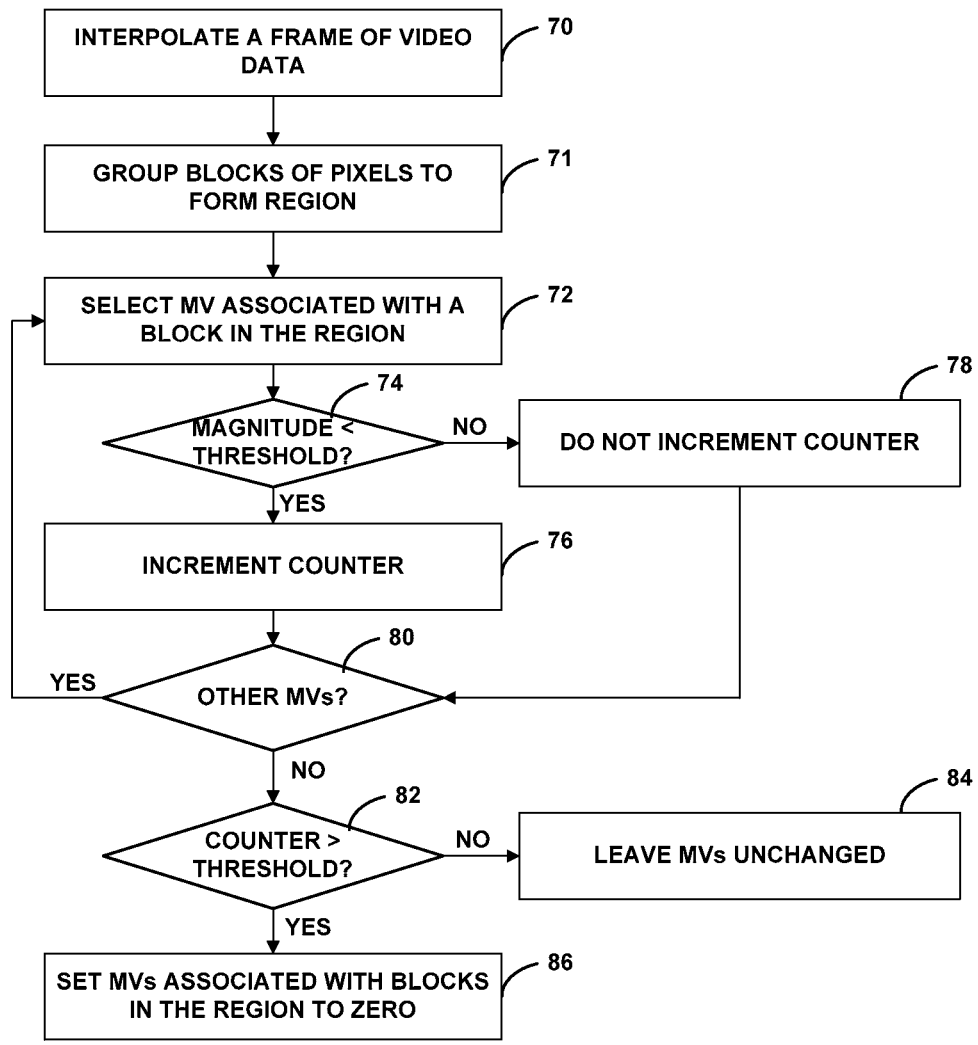
FIG. 5 is a flow diagram illustrating exemplary operation of an interpolation decoder module removing motion vectors that are identified as motion noise.

FIG. 5 is a flow diagram illustrating exemplary operation of an interpolation decoder module, such as interpolation decoder module 24 of FIGS. 1 and 2, removing motion vectors that are identified as motion noise. Initially, interpolation decoder module 24 interpolates a frame of video data based on one or more reference frames (70). In particular, interpolation decoder module 24 may interpolate the frame of video data in a block-based mode by dividing the skipped frame into a plurality of blocks of pixels and interpolating each of the blocks of pixels based on corresponding blocks of pixels in the reference frame or frames.

Interpolation decoder module 24 may group a plurality of blocks of pixels to form a region of the interpolated frame (71). Interpolation decoder module 24 may group a plurality of blocks of pixels that are adjacent to one another to form the region of the interpolated frame, and each of the blocks of pixels corresponds to an associated motion vector. In one example, interpolation decoder module 24 may group adjacent blocks of pixels that have substantially similar motion vectors. The region of the interpolated frame may, for example, be a grouping of three blocks of pixels by three blocks of pixels, where each of the blocks of pixels is a 16×16 blocks of pixels. In other words, the region may include nine 16×16 blocks of pixels that form a three by three block.

Interpolation decoder module 24 selects a first motion vector associated with one of the blocks of pixels in the region (72). Interpolation decoder module 24 compares a magnitude of the selected motion vector to the threshold magnitude to determine whether the magnitude of the selected motion vector is less than the threshold magnitude (74). Interpolation decoder module 24 may compute the threshold magnitude as a function of the motion of the entire interpolated frame. For example, interpolation decoder module 24 may assign motion vectors to all the blocks of the interpolated frame, calculate an average motion vector for the interpolated frame and a standard deviation of the motion vectors. Interpolation decoder module 24 may compute the threshold magnitude as a function of the average motion vector and the standard deviation. Alternatively, interpolation decoder module 24 may compute the threshold magnitude as a function of the motion of the reference frame, e.g., using an average motion vector and a standard deviation of the motion vectors of the reference frame.

If the magnitude of the selected motion vector is less than the threshold magnitude, interpolation decoder module 24 increments a counter to track the number of motion vectors that are less than the threshold magnitude (76). If the magnitude of the selected motion vector is greater than or equal to the threshold magnitude, interpolation decoder module 24 does not increment the counter (78). In this manner, interpolation decoder module 24 tracks the number of motion vectors associated with blocks of pixels in the region that are less than the threshold magnitude.

Interpolation decoder module 24 determines whether there are any other motion vectors associated with blocks of pixels within the region that have not been compared to the threshold magnitude (80). If there are other more motion vectors associated with blocks of pixels within the region that have not been compared to the threshold magnitude, interpolation decoder module 24 selects the next motion vector associated with another one of the blocks of pixels in the region, compares a magnitude of the selected motion vector to the threshold magnitude and increments the counter if the magnitude of the selected motion vector is less than the threshold magnitude. Interpolation decoder module 24 continues to compare the motion vectors associated with the blocks of pixels in the region to the threshold magnitude until all the motion vectors associated with the blocks of pixels in the region have been analyzed.

After all the motion vectors associated with blocks of pixels in the region have been compared to the threshold magnitude, interpolation decoder module 24 determines whether the counter exceeds a counter threshold (82). If the counter does not exceed the counter threshold, interpolation decoder module 24 does not change the motion vectors associated with the blocks of pixels in the region (84). Thus, if the counter does not exceed the motion vectors associated within the blocks is considered to be relevant and not just motion noise. If the counter exceeds the threshold counter value, interpolation decoder module 24 sets the motion vectors associated with the blocks of pixels in the region equal to zero (86). In this manner, interpolation decoder module removing motion vectors that are identified as motion noise.

Figure 6:
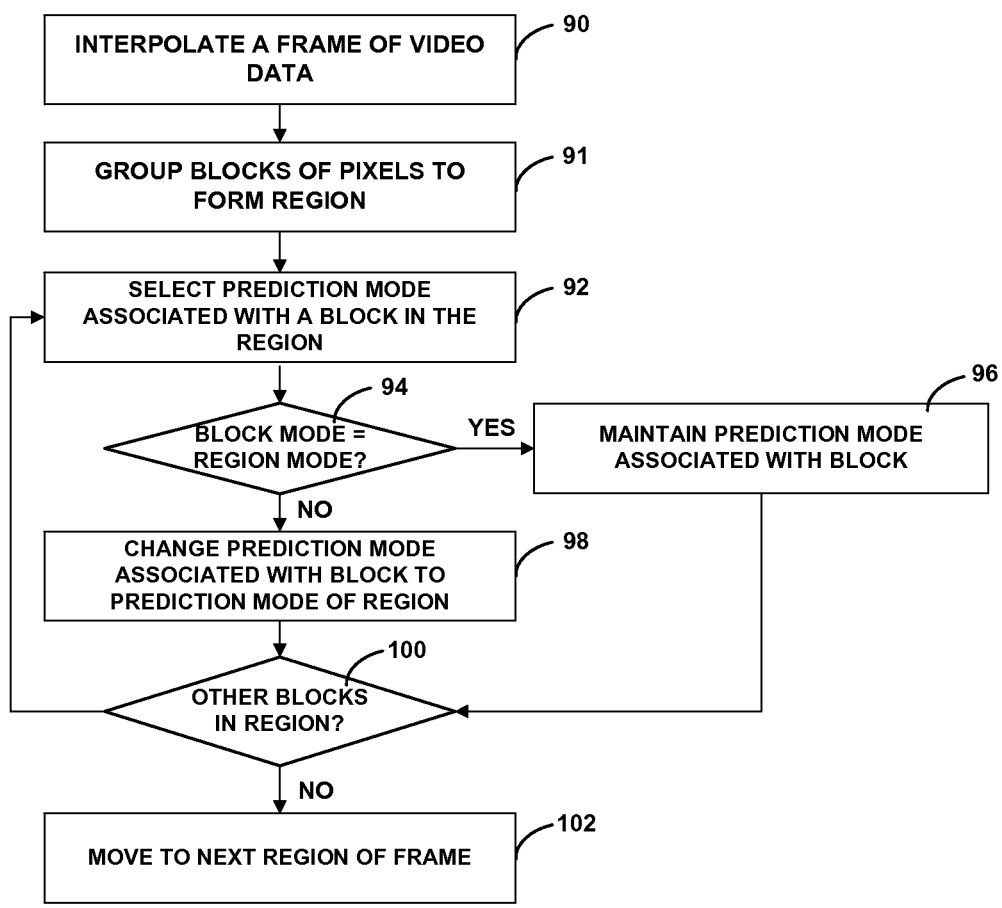
FIG. 6 is a flow diagram illustrating exemplary operation of an interpolation decoder module adjusting prediction modes of one or more blocks of pixels in a region so that all the blocks of pixels in the region have the same prediction mode.

FIG. 6 is a flow diagram illustrating exemplary operation of an interpolation decoder module, such as interpolation decoder module 24 of FIGS. 1 and 2, adjusting prediction modes of one or more blocks of pixels in a region so that all the blocks of pixels in the region have the same prediction mode. Initially, interpolation decoder module 24 interpolates a frame of video data based on one or more reference frames (90). In particular, interpolation decoder module 24 may interpolate the frame of video data in a block-based mode by dividing the skipped frame into a plurality of blocks of pixels and interpolating each of the blocks of pixels based on corresponding blocks of pixels in the reference frame or frames.

Interpolation decoder module 24 may group a plurality of blocks of pixels to form a region of the interpolated frame (91). Interpolation decoder module 24 may group a plurality of blocks of pixels that are adjacent to one another to form the region of the interpolated frame. Alternatively, interpolation decoder module 24 may use the described techniques to adjust the prediction modes of the blocks of pixels of the entire frame have the same prediction modes. In this case, the region is the entire frame.

Interpolation decoder module 24 selects a prediction mode associated with one of the blocks of pixels in the region (92). Interpolation decoder module 24 determines whether the prediction mode associated with the selected block of pixels is equal to a prediction mode associated with the region to which the block of pixels belongs (94). Interpolation decoder module 24 may identify the prediction mode of the region by analyzing the prediction mode associated with all the blocks in the region. For example, interpolation decoder module 24 may select the prediction mode associated with the region to be the prediction mode associated with at least a majority of the blocks of pixels that form the region.

If the prediction mode associated with the selected block of pixels is equal to the prediction mode associated with the region to which the block of pixels belongs, interpolation decoder module 24 does not change the prediction mode of the block (96). If the prediction mode associated with the selected block of pixels is not equal to the prediction mode associated with the region to which the block of pixels belongs, interpolation decoder module 24 changes the prediction mode of the block to the prediction mode associated with the region to which the block belongs (98). For example, if the prediction mode of the majority of the blocks of pixels belonging to the region is a unidirectional prediction mode and the prediction mode of the selected block is a bi-directional prediction mode, the prediction mode of the selected block may be changed from the bi-directional mode to unidirectional mode.

Interpolation decoder module 24 determines whether there are any more blocks of pixels in the region that have prediction modes that have not yet been analyzed (100). If there are more blocks within the region that have prediction modes that have not yet been analyzed, interpolation decoder module 24 selects the next block from the region, compares the prediction mode associated with the block to the prediction mode associated with the region and changes the prediction mode associated with the block to that associated with the region if the prediction mode associated with the selected block is different than the prediction mode associated with the region. Interpolation decoder module 24 continues to analyze the prediction modes of the blocks in the region until all the blocks prediction modes have been analyzed. After all the block prediction modes of the region have been analyzed, interpolation decoder module 24 moves to the next region of the frame and does a similar sort of analysis (102).

Figure 7:
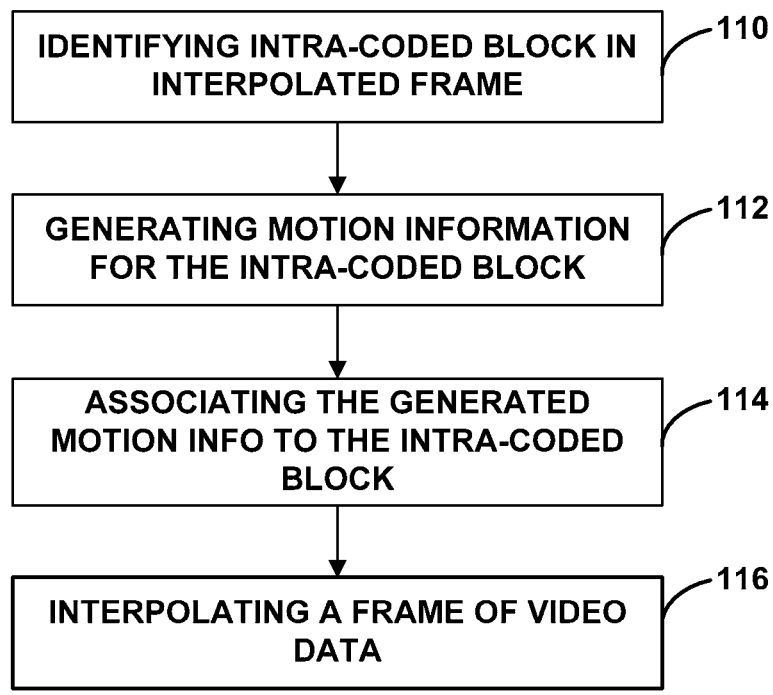
FIG. 7 is a flow diagram illustrating exemplary operation of an interpolation decoder module adjusting block information associated with blocks of pixels in one or more reference frames instead of the interpolated frames to reduce artifacts in the interpolated frame.

FIG. 7 is a flow diagram illustrating exemplary operation of an interpolation decoder module, such as interpolation decoder module 24 of FIGS. 1 and 2, adjusting block information associated with blocks of pixels in one or more reference frames instead of the interpolated frames to reduce artifacts in the interpolated frame. In particular, interpolation decoder module 24 identifies blocks of pixels in one or more reference frames that are encoded using intra-coding techniques and generate motion information for the intra-coded blocks of pixels.

Initially, interpolation decoder module 24 identifies an intra-coded block of pixels in a reference frame (110). In response to identifying an intra-coded block of pixels, interpolation decoder module 24 generates motion information for the intra-coded block of pixels (112). Interpolation decoder module 24 may generate a motion vector associated with the intra-coded block of pixels using motion vectors associated with one or more neighboring blocks of pixels. For example, interpolation decoder module 24 may compute a motion vector associated with the intra-coded block of pixels by computing a mean or median of the motion vectors associated with blocks of pixels surrounding the intra-coded block of pixels.

Interpolation decoder module 24 associates the generated motion information with the intra-coded block of pixels (114). Thus, the intra-coded block of pixels becomes inter-coded. Interpolation decoder module 24 interpolates a skipped frame of video data using the adjusted reference frame (116). In particular, interpolation decoder module 24 interpolates a block of pixels of the skipped frame using the motion information associated with the recently converted intra-coded block of pixels. In other words, the adjusted block information of the reference frames is then used by interpolation decoder module 24 to generate motion vectors and select prediction modes for the skipped frame.

Figure 8:
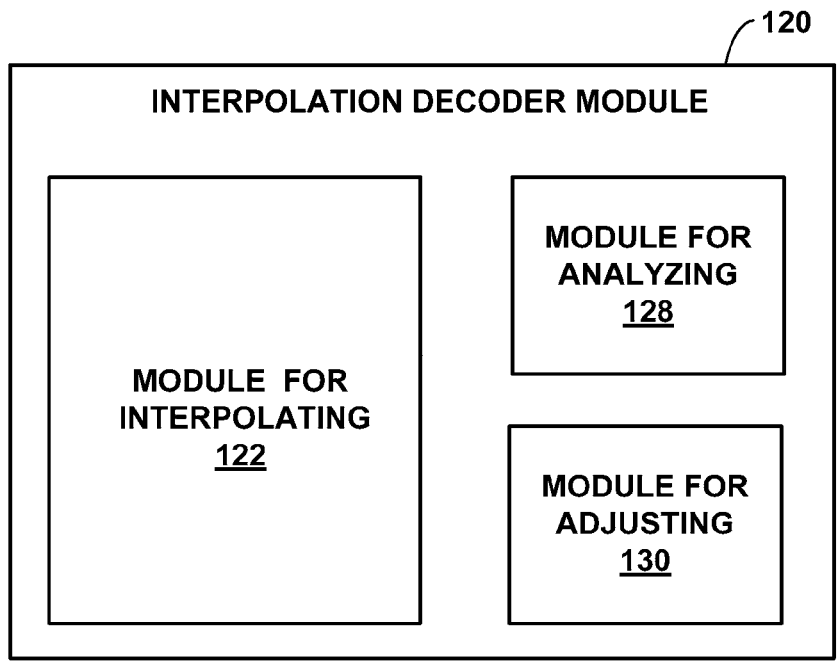
FIG. 8 is a block diagram illustrating another exemplary interpolation decoder module for use in a video decoder.

FIG. 8 is a block diagram illustrating an exemplary interpolation decoder module 120 for use in a video decoder, such as video decoder 14 of FIG. 1. Interpolation decoder module 120 includes a module for interpolating 122, a module for analyzing 128 and a module for adjusting 130. In one aspect, module for analyzing 128 and module for adjusting 130 may comprise modules within an interpolated frame adjustment module, such as interpolated frame adjustment module 34 of FIG. 2. The modules illustrated in FIG. 8 operate together to produce an interpolated frame.

In particular, interpolation decoder module 120 adjusts block information associated with one or more blocks of pixels of an interpolated frame in accordance with one or more of the techniques of this disclosure to reduce artifacts in the interpolated frame. As an example, module for interpolating 122 interpolates a frame of video data based on one or more frames of video data adjacent to the interpolated frame, module for analyzing 128 analyzes block information of the interpolated frame to determine whether to adjust the block information, and module for adjusting 130 adjusts block information of the interpolated frame based on the analysis to reduce artifacts in the interpolated frame.

Figure 9:
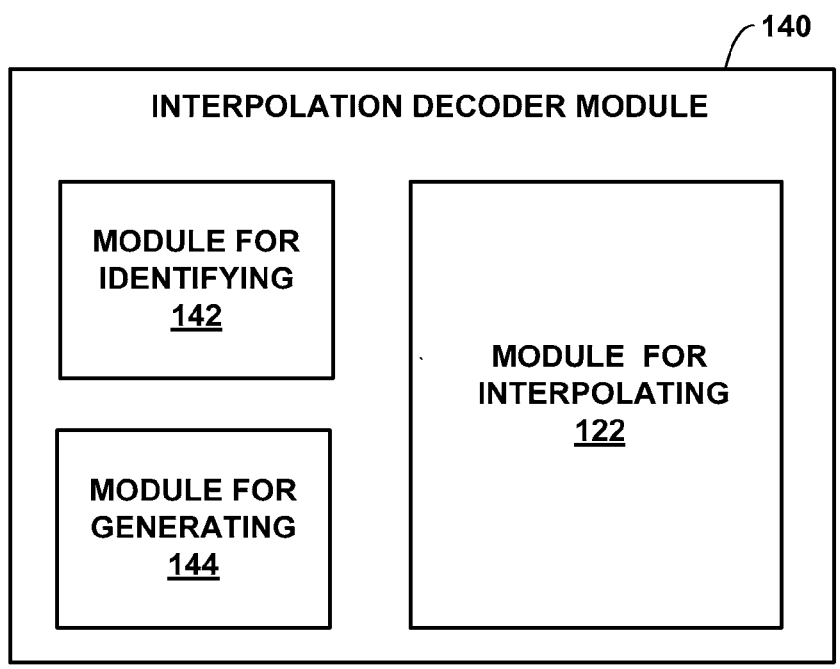
FIG. 9 is a block diagram illustrating another exemplary interpolation decoder module for use in a video decoder.

In accordance with this disclosure, means for interpolating a frame of video data based on one or more frames of video data adjacent to the interpolated frame may comprise interpolation decoder module 24 (FIG. 1), interpolation module 32 (FIG. 2), or module for interpolating 122 (FIGS. 8 and 9). Similarly, means for analyzing block information of the interpolated frame to determine whether to adjust the block information may comprise interpolation decoder module 24 (FIG. 1), interpolated frame adjustment module 34 (FIG. 2), analysis module 35 (FIG. 2), or module for analyzing 128 (FIG. 8). Means for adjusting block information of the interpolated frame based on the analysis to reduce artifacts in the interpolated frame may include interpolation decoder module 24 (FIG. 1), interpolated frame adjustment module 34 (FIG. 2), adjustment module 37 (FIG. 2), or module for adjusting 130 (FIG. 8). Although the above examples are provided for purposes of illustration, the disclosure may include other instances of structure that corresponds to respective means.

FIG. 9 is a block diagram illustrating another exemplary interpolation decoder module 140 for use in a video decoder, such as video decoder 14 of FIG. 1. Interpolation decoder module 140 includes a module for identifying 142, a module for generating 144 and a module for interpolating 122. In one aspect, module for identifying 142 and module for generating 144 may comprise modules within a reference frame adjustment module, such as reference frame adjustment module 36 of FIG. 2. The modules illustrated in FIG. 9 operate together to produce an interpolated frame.

In particular, interpolation decoder module 140 adjusts block information associated with one or more blocks of pixels of a reference frame in accordance with one or more of the techniques of this disclosure to reduce artifacts in the interpolated frame. For example, module for identifying 142 identifies an intra-coded block of pixels in a reference frame of video data, module for generating 144 generates motion information for the intra-coded block of pixels, and module for interpolating 122 interpolates a frame of video data using the generated motion information along with any other motion information associated with one or more adjacent frames.

In accordance with this disclosure, means for interpolating a frame of video data based on one or more frames of video data adjacent to the interpolated frame may comprise interpolation decoder module 24 (FIG. 1), interpolation module 32 (FIG. 2), or module for interpolating 122 (FIGS. 8 and 9). Means for identifying an intra-coded block of pixels in a reference frame of video data may comprise interpolation decoder module 24 (FIG. 1), reference frame adjustment module 36 (FIG. 2), or module for identifying 142 (FIG. 9). Means for generating motion information for the intra-coded block of pixels may comprise interpolation decoder module 24 (FIG. 1), reference frame adjustment module 36 (FIG. 2), or module for generating 144 (FIG. 9). Although the above examples are provided for purposes of illustration, the disclosure may include other instances of structure that corresponds to respective means.

The techniques described herein may be implemented in hardware, software, firmware, or any combination thereof. If implemented in hardware, the techniques may be realized using digital hardware, analog hardware, or both. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

A computer program product, as disclosed herein, includes a computer-readable medium as well as any materials associated with the computer-readable medium, including packaging materials within which the computer-readable medium is packaged. The code associated with a computer-readable medium of the computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Various aspects of the disclosure have been described. These and other aspects are within the scope of the following claims.

What is claimed is:

1. A method for processing digital video data, the method comprising:
   interpolating a frame of video data based on one or more frames of video data adjacent to the interpolated frame; and
   after interpolating the frame:
   analyzing block information including motion vectors associated with a block of pixels in the interpolated frame to determine whether to adjust the block information;
   adjusting the block information of the interpolated frame based on the analysis to reduce artifacts in the interpolated frame; and
   merging motion vectors associated with a plurality of sub-blocks to obtain a single motion vector for the block of pixels if the block does not include static content.

2. The method of claim 1, wherein the adjustment comprises adjusting one or more motion vectors.

3. The method of claim 1, wherein the adjustment comprises adjusting one or more prediction modes associated with blocks of pixels of the interpolated frame.

4. The method of claim 1, wherein:
   the analysis comprises analyzing a plurality of motion vectors associated with the block of pixels in the interpolated frame to determine a content of the block, and
   the adjustment comprises setting each of the motion vectors to zero if the block of pixels includes both static content and non-static content.

5. The method of claim 4, wherein the analysis comprises:
   comparing one of the plurality of motion vectors associated with the block of pixels with the other ones of the plurality of motion vectors associated with the block of pixels; and
   determining that the block of pixels includes both static content and non-static content if the comparison between the one of the plurality of motion vectors and any of the other motion vectors equals or exceeds a threshold.

6. The method of claim 5, wherein:
   the comparison comprises computing differences between a magnitude of one of the plurality of motion vectors and the other ones of the plurality of motion vectors; and
   the determination comprises determining that the block of pixels includes both static content and non-static content if at least one of the computed differences equals or exceeds a threshold magnitude difference.

7. The method of claim 5, wherein:
   the comparison comprises computing differences between a direction associated with one of the plurality of motion vectors and directions associated with the other ones of the plurality of motion vectors; and the determination comprises determining that the block of pixels includes both static content and non-static content if at least one of the computed differences equals or exceeds a threshold directional difference.

8. The method of claim 4, wherein the analysis comprises analyzing the plurality of motion vectors associated with a 16×16 block of pixels, wherein each of the motion vectors is associated with a sub-block of the 16×16 block of pixels.

9. The method of claim 1, wherein:
the analysis comprises a boundary of an image associated with a block of pixels in the interpolated frame, wherein some of the pixels of the block correspond to the boundary; and
the adjustment comprises associating a motion vector associated with the block of pixels only with pixels of the block that do not correspond to the boundary.

10. The method of claim 9, wherein the identification comprises:
detecting a boundary within a corresponding block of pixels in a reference frame; and
associating the boundary within the corresponding block of pixels in the reference frame to the boundary within the block of pixels of the interpolated frame.

11. The method of claim 9, further comprising shifting the motion vector associated with the block of pixels of the interpolated video frame.

12. The method of claim 9, further comprising detecting the boundary based on reconstructed pixel values.

13. The method of claim 1, wherein:
the analysis comprises comparing a plurality of motion vectors of a region in the interpolated frame to a threshold magnitude, and
the adjustment comprises setting the motion vectors of the region equal to zero if at least a majority of the motion vectors of the region are below the threshold.

14. The method of claim 13, further comprising computing the threshold as a function of motion of the entire interpolated frame.

15. The method of claim 13, further comprising grouping blocks of pixels that are adjacent to one another to form the region of the interpolated frame, wherein each of the blocks of pixels corresponds to one of the plurality of motion vectors.

16. The method of claim 15, wherein the grouping comprises grouping adjacent blocks of pixels that have substantially similar motion vectors.

17. The method of claim 15, wherein the grouping comprises grouping three blocks of pixels by three blocks of pixels to form the region, wherein each of the blocks of pixels is a 16×16 block of pixels.

18. The method of claim 1, wherein:
the analysis comprises comparing a prediction mode associated with a block of pixels in the interpolated frame with a prediction mode associated with a region in the interpolated frame to which the block belongs, and
the adjustment comprises changing the prediction mode associated with the block of pixels to the prediction mode of the region if the prediction mode associated with the block is different than the prediction mode of the region.

19. The method of claim 18, further comprising analyzing prediction modes associated with a plurality of blocks of pixels that form the region to determine the prediction mode of the region.

20. The method of claim 19, wherein the analysis comprises selecting the prediction mode associated with at least a majority of the blocks of pixels that form the region.

21. The method of claim 18, further comprising maintaining the prediction mode associated with the block of pixels if the prediction mode associated with the block of pixels is the same as the prediction mode of the region.

22. The method of claim 18, wherein the prediction modes comprise one of intra prediction modes, forward prediction modes, backward prediction modes and bi-directional prediction modes.

23. The method of claim 1, wherein the adjustment comprises adjusting the block information in the interpolated frame to reduce shaking static background artifacts.

24. The method of claim 1, wherein the adjustment comprises adjusting the block information in the interpolated frame to reduce blocky artifacts.

25. An apparatus for processing digital video data, the apparatus comprising:
an interpolation module that interpolates a frame of video data based on one or more frames of video data adjacent to the interpolated frame;
an analysis module that analyzes block information including motion vectors associated with a block of pixels in the interpolated frame to determine whether to adjust the block information;
an adjustment module that adjusts the block information of the interpolated frame based on the analysis to reduce artifacts in the interpolated frame; and
wherein the adjustment module merges motion vectors associated with a plurality of sub-blocks to obtain a single motion vector for the block of pixels if the block does not include static content.

26. The apparatus of claim 25, wherein the adjustment module adjusts one or more motion vectors.

27. The apparatus of claim 25, wherein the adjustment module adjusts one or more prediction modes associated with blocks of pixels of the interpolated frame.

28. The apparatus of claim 25, wherein:
the analysis module analyzes a plurality of motion vectors associated with the block of pixels in the interpolated frame to determine a content of the block, and
the adjustment module sets each of the motion vectors to zero if the block of pixels includes both static content and non-static content.

29. The apparatus of claim 28, wherein the analysis module compares one of the plurality of the motion vectors associated with the block of pixels with the other ones of the plurality of motion vectors associated with the block of pixels and determines that the block of pixels includes both static content and non-static content if the comparison between the one of the plurality of motion vectors and any of the other motion vectors equals or exceeds a threshold.

30. The apparatus of claim 29, wherein the analysis module computes differences between a magnitude of one of the plurality of motion vectors and the other ones of the plurality of motion vectors, and determines that the block of pixels includes both static content and non-static content if at least one of the computed differences equals or exceeds a threshold difference.

31. The apparatus of claim 25, wherein the analysis module computes differences between a direction associated with of one of the plurality of motion vectors and directions associated with the other ones of the plurality of motion vectors, and determines that the block of pixels includes both static content and non-static content if at least one of the computed directional differences equals or exceeds a threshold difference.

32. The apparatus of claim 28, wherein the analysis module analyzes a plurality of motion vectors associated with a 16×16 block of pixels, wherein each of the motion vectors is associated with a sub-block of the 16×16 block of pixels.

33. The apparatus of claim 25, wherein:
the analysis module identifies a boundary of an image associated with a block of pixels in the interpolated frame, wherein some of the pixels of the block correspond to the boundary, and
the adjustment module associates a motion vector associated with the block of pixels only with pixels of the block that do not correspond to the boundary.

34. The apparatus of claim 33, wherein the analysis module detects a boundary within a corresponding block of pixels in a reference frame and associates the boundary within the corresponding block of pixels in the reference frame to the boundary within the block of pixels of the interpolated frame.

35. The apparatus of claim 33, wherein the adjustment module shifts the motion vector associated with the block of pixels of the interpolated video frame.

36. The apparatus of claim 33, wherein the analysis module detects the boundary based on reconstructed pixel values.

37. The apparatus of claim 25, wherein:
the analysis module compares a plurality of motion vectors of a region in the interpolated frame to a threshold magnitude, and
the adjustment module sets the motion vectors of the region equal to zero if at least a majority of the motion vectors of the region are below the threshold.

38. The apparatus of claim 37, wherein the analysis module computes the threshold as a function of motion of the entire interpolated frame.

39. The apparatus of claim 37, wherein the analysis module groups blocks of pixels that are adjacent to one another to form the region of the interpolated frame, wherein each of the blocks of pixels corresponds to one of the plurality of motion vectors.

40. The apparatus of claim 39, wherein the analysis module groups adjacent blocks of pixels that have substantially similar motion vectors.

41. The apparatus of claim 39, wherein the analysis module groups three blocks of pixels by three blocks of pixels to form the region, wherein each of the blocks of pixels is a 16×16 block of pixels.

42. The apparatus of claim 25, wherein:
the analysis module compares a prediction mode associated with a block of pixels in the interpolated frame with a prediction mode associated with a region in the interpolated frame of video data to which the block belongs, and
the adjustment module changes the prediction mode associated with the block of pixels to the prediction mode of the region if the prediction mode associated with the block is different than the prediction mode of the region.

43. The apparatus of claim 42, wherein the analysis module analyzes prediction modes associated with a plurality of blocks of pixels that form the region to determine the prediction mode of the region.

44. The apparatus of claim 43, wherein the analysis module selects the prediction mode associated with at least a majority of the blocks of pixels that form the region.

45. The apparatus of claim 42, wherein the adjustment module maintains the prediction mode associated with the block of pixels if the prediction mode associated with the block of pixels is the same as the prediction mode of the region.

46. The apparatus of claim 42, wherein the prediction modes comprise one of intra prediction modes, forward prediction modes, backward prediction modes and bi-directional prediction modes.

47. The apparatus of claim 25, wherein the adjustment module adjusts the block information in the interpolated frame to reduce shaking static background artifacts.

48. The apparatus of claim 25, wherein the adjustment module adjusts the block information in the interpolated frame to reduce blocky artifacts.

49. An apparatus for processing digital video data, the apparatus comprising:
means for interpolating a frame of video data based on one or more frames of video data adjacent to the interpolated frame;
means for analyzing block information including motion vectors associated with a block of pixels in the interpolated frame to determine whether to adjust the block information;
means for adjusting block information of the interpolated frame based on the analysis to reduce artifacts in the interpolated frame; and
means for merging motion vectors associated with a plurality of sub-blocks to obtain a single motion vector for the block of pixels if the block does not include static content.

50. The apparatus of claim 49, wherein the adjusting means adjusts one or more motion vectors.

51. The apparatus of claim 49, wherein the adjusting means adjusts one or more prediction modes associated with blocks of pixels of the interpolated frame.

52. The apparatus of claim 49, wherein:
the analyzing means analyze a plurality of motion vectors associated with the block of pixels in the interpolated frame to determine a content of the block, and
the adjusting means sets each of the motion vectors to zero if the block of pixels includes both static content and non-static content.

53. The apparatus of claim 52, wherein the analyzing means compares one of the plurality of motion vectors associated with the block of pixels with the other ones of the plurality of motion vectors associated with the block of pixels, and determines that the block of pixels includes both static content and non-static content if the comparison between the one of the plurality of motion vectors and any of the other motion vectors equals or exceeds a threshold.

54. The apparatus of claim 53, wherein the analyzing means computes differences between a magnitude of one of the plurality of motion vectors and the other ones of the plurality of motion vectors, and determines that the block of pixels includes both static content and non-static content if at least one of the computed differences equals or exceeds a threshold difference.

55. The apparatus of claim 53, wherein the analyzing means computes differences between a direction associated with of one of the plurality of motion vectors and directions associated with the other ones of the plurality of motion vectors, and determines that the block of pixels includes both static content and non-static content if at least one of the computed directional differences equals or exceeds a threshold difference.

56. The apparatus of claim 52, wherein the analyzing means analyzes a plurality of motion vectors associated with a 16×16 block of pixels, wherein each of the motion vectors is associated with a sub-block of the 16×16 block of pixels.

57. The apparatus of claim 49, wherein:
the analyzing means identifies a boundary of an image associated with a block of pixels in the interpolated frame, wherein some of the pixels of the block of pixels correspond to the boundary, and
the adjusting means associates a motion vector associated with the block of pixels only with pixels of the block that do not correspond to the boundary.

58. The apparatus of claim 57, wherein the analyzing means detects a boundary within a corresponding block of pixels in a reference frame and associates the boundary within the corresponding block of pixels in the reference frame to the boundary within the block of pixels of the interpolated frame.

59. The apparatus of claim 57, wherein the adjusting means shifts the motion vector associated with the block of pixels of the interpolated video frame.

60. The apparatus of claim 57, wherein the analyzing means detects the boundary based on reconstructed pixel values.

61. The apparatus of claim 49, wherein:
the analyzing means compares a plurality of motion vectors of a region in the interpolated frame to a threshold magnitude, and
the adjusting means sets the motion vectors of the region equal to zero if at least a majority of the motion vectors of the region are below the threshold.

62. The apparatus of claim 61, wherein the analyzing means computes the threshold as a function of motion of the entire interpolated frame.

63. The apparatus of claim 61, wherein the analyzing means groups blocks of pixels that are adjacent to one another to form the region of the interpolated frame, wherein each of the blocks of pixels corresponds to one of the plurality of motion vectors.

64. The apparatus of claim 61, wherein the analyzing means groups adjacent blocks of pixels that have substantially similar motion vectors.

65. The apparatus of claim 61, wherein the analyzing means groups three blocks of pixels by three blocks of pixels to form the region, wherein each of the blocks of pixels is a 16×16 block of pixels.

66. The apparatus of claim 49, wherein:
the analyzing means compare a prediction mode associated with a block of pixels in the interpolated frame with a prediction mode associated with a region in the interpolated frame to which the block belongs, and
the adjusting means changes the prediction mode associated with the block of pixels to the prediction mode of the region if the prediction mode associated with the block is different than the prediction mode of the region.

67. The apparatus of claim 66, wherein the analyzing means analyzes prediction modes associated with a plurality of blocks of pixels that form the region to determine the prediction mode of the region.

68. The apparatus of claim 67, wherein the analyzing means selects the prediction mode associated with at least a majority of the blocks of pixels that form the region.

69. The apparatus of claim 66, wherein the adjusting means maintains the prediction mode associated with the block of pixels if the prediction mode associated with the block of pixels is the same as the prediction mode of the region.

70. The apparatus of claim 66, wherein the prediction modes comprise one of intra prediction modes, forward prediction modes, backward prediction modes and bi-directional prediction modes.

71. The apparatus of claim 49, wherein the adjusting means adjusts the block information in the interpolated frame to reduce shaking static background artifacts.

72. The apparatus of claim 49, wherein the adjusting means adjusts the block information in the interpolated frame to reduce blocky artifacts.

73. A computer program product comprising:
a non-transitory computer-readable medium comprising codes for causing at least one computer to:
interpolate a frame of video data based on at least two decoded frames of video data;
analyze block information including motion vectors associated with a block of pixels in the interpolated frame to determine whether to adjust the block information;
adjust the block information of the interpolated frame based on the analysis to reduce artifacts in the interpolated frame; and
merge motion vectors associated with a plurality of sub-blocks to obtain a single motion vector for the block of pixels if the block does not include static content.

74. A processor for processing digital video data, the processor being adapted to:
interpolate a frame of video data based on at least two decoded frames of video data;
analyze block information including motion vectors associated with a block of pixels in the interpolated frame to determine whether to adjust the block information;
adjust the block information of the interpolated frame based on the analysis to reduce artifacts in the interpolated frame; and
merge motion vectors associated with a plurality of sub-blocks to obtain a single motion vector for the block of pixels if the block does not include static content.

75. The computer program product of claim 73, wherein the codes for causing at least one computer to adjust comprise codes for causing at least one computer to adjust one or more motion vectors.

76. The computer program product of claim 73, wherein the codes for causing at least one computer to adjust comprise codes for causing at least one computer to adjust one or more prediction modes associated with blocks of pixels of the interpolated frame.

77. The computer program product of claim 73, wherein:
the codes for causing at least one computer to analyze comprise codes for causing at least one computer to analyze a plurality of motion vectors associated with the block of pixels in the interpolated frame to determine a content of the block, and
the codes for causing at least one computer to adjust comprise codes for causing at least one computer to set each of the motion vectors to zero if the block of pixels includes both static content and non-static content.

78. The computer program product of claim 77, wherein the codes for causing at least one computer to analyze comprise codes for causing at least one computer to:
compare one of the plurality of motion vectors associated with the block of pixels with the other ones of the plurality of motion vectors associated with the block of pixels; and
determine that the block of pixels includes both static content and non-static content if the comparison between the one of the plurality of motion vectors and any of the other motion vectors equals or exceeds a threshold.

79. The computer program product of claim 78, wherein:
the codes for causing at least one computer to compare comprise codes for causing at least one computer to compute differences between a magnitude of one of the plurality of motion vectors and the other ones of the plurality of motion vectors; and the codes for causing at least one computer to determine comprise codes for causing at least one computer to determine that the block of pixels includes both static content and non-static content if at least one of the computed differences equals or exceeds a threshold magnitude difference.

80. The computer program product of claim 78, wherein:
the codes for causing at least one computer to compare comprise codes for causing at least one computer to compute differences between a direction associated with one of the plurality of motion vectors and directions associated with the other ones of the plurality of motion vectors; and the codes for causing at least one computer to determine comprise codes for causing at least one computer to determine that the block of pixels includes both static content and non-static content if at least one of the computed differences equals or exceeds a threshold directional difference.

81. The computer program product of claim 77, wherein the codes for causing at least one computer to analyze comprise codes for causing at least one computer to analyze the plurality of motion vectors associated with a 16x16 block of pixels, wherein each of the motion vectors is associated with a sub-block of the 16x16 block of pixels.

82. The computer program product of claim 73, wherein:
the codes for causing at least one computer to analyze comprise a boundary of an image associated with a block of pixels in the interpolated frame, wherein some of the pixels of the block correspond to the boundary; and the codes for causing at least one computer to adjust comprise codes for causing at least one computer to associate a motion vector associated with the block of pixels only with pixels of the block that do not correspond to the boundary.

83. The computer program product of claim 82, wherein the codes for causing at least one computer to analyze comprise codes for causing at least one computer to:
detect a boundary within a corresponding block of pixels in a reference frame; and
associate the boundary within the corresponding block of pixels in the reference frame to the boundary within the block of pixels of the interpolated frame.

84. The computer program product of claim 82, further comprising codes for causing at least one computer to shift the motion vector associated with the block of pixels of the interpolated video frame.

85. The computer program product of claim 82, further comprising codes for causing at least one computer to detect the boundary based on reconstructed pixel values.

86. The computer program product of claim 73, wherein:
the codes for causing at least one computer to analyze comprise codes for causing at least one computer to compare a plurality of motion vectors of a region in the interpolated frame to a threshold magnitude, and the codes for causing at least one computer to adjust comprise codes for causing at least one computer to set the motion vectors of the region equal to zero if at least a majority of the motion vectors of the region are below the threshold.

87. The computer program product of claim 86, further comprising codes for causing at least one computer to compute the threshold as a function of motion of the entire interpolated frame.

88. The computer program product of claim 86, further comprising codes for causing at least one computer to group blocks of pixels that are adjacent to one another to form the region of the interpolated frame, wherein each of the blocks of pixels corresponds to one of the plurality of motion vectors.

89. The computer program product of claim 88, wherein the codes for causing at least one computer to group comprise codes for causing at least one computer to group adjacent blocks of pixels that have substantially similar motion vectors.

90. The computer program product of claim 88, wherein the codes for causing at least one computer to group comprise codes for causing at least one computer to group three blocks of pixels by three blocks of pixels to form the region, wherein each of the blocks of pixels is a 16x16 block of pixels.

91. The computer program product of claim 73, wherein:
the codes for causing at least one computer to analyze comprise codes for causing at least one computer to compare a prediction mode associated with a block of pixels in the interpolated frame with a prediction mode associated with a region in the interpolated frame to which the block belongs, and the codes for causing at least one computer to adjust comprise codes for causing at least one computer to change the prediction mode associated with the block of pixels to the prediction mode of the region if the prediction mode associated with the block is different than the prediction mode of the region.

92. The computer program product of claim 91, further comprising codes for causing at least one computer to analyze prediction modes associated with a plurality of blocks of pixels that form the region to determine the prediction mode of the region.

93. The computer program product of claim 92, wherein the codes for causing at least one computer to analyze comprise codes for causing at least one computer to select the prediction mode associated with at least a majority of the blocks of pixels that form the region.

94. The computer program product of claim 91, further comprising codes for causing at least one computer to maintain the prediction mode associated with the block of pixels if the prediction mode associated with the block of pixels is the same as the prediction mode of the region.

95. The computer program product of claim 91, wherein the prediction modes comprise one of intra prediction modes, forward prediction modes, backward prediction modes and bi-directional prediction modes.

96. The computer program product of claim 73, wherein the codes for causing at least one computer to adjust comprise codes for causing at least one computer to adjust the block information in the interpolated frame to reduce shaking static background artifacts.

97. The computer program product of claim 73, wherein the codes for causing at least one computer to adjust comprise codes for causing at least one computer to adjust the block information in the interpolated frame to reduce blocky artifacts.

98. The processor of claim 74, wherein the processor being adapted to adjust comprises the processor being adapted to adjust one or more motion vectors.

99. The processor of claim 74, wherein the processor being adapted to adjust comprises the processor being adapted to adjust one or more prediction modes associated with blocks of pixels of the interpolated frame.

100. The processor of claim 74, wherein:
the processor being adapted to analyze comprises the processor being adapted to analyze a plurality of motion vectors associated with the block of pixels in the interpolated frame to determine a content of the block, and
the processor being adapted to adjust comprises the processor being adapted to set each of the motion vectors to zero if the block of pixels includes both static content and non-static content.

101. The processor of claim 100, wherein the processor being adapted to analyze comprises the processor being adapted to:
compare one of the plurality of motion vectors associated with the block of pixels with the other ones of the plurality of motion vectors associated with the block of pixels; and
determine that the block of pixels includes both static content and non-static content if the comparison between the one of the plurality of motion vectors and any of the other motion vectors equals or exceeds a threshold.

102. The processor of claim 101, wherein:
the processor being adapted to compare comprises the processor being adapted to compute differences between a magnitude of one of the plurality of motion vectors and the other ones of the plurality of motion vectors; and
the processor being adapted to determine comprises the processor being adapted to determine that the block of pixels includes both static content and non-static content if at least one of the computed differences equals or exceeds a threshold magnitude difference.

103. The processor of claim 101, wherein:
the processor being adapted to compare comprises the processor being adapted to compute differences between a direction associated with one of the plurality of motion vectors and directions associated with the other ones of the plurality of motion vectors; and
the processor being adapted to determine comprises the processor being adapted to determine that the block of pixels includes both static content and non-static content if at least one of the computed differences equals or exceeds a threshold directional difference.

104. The processor of claim 100, wherein the processor being adapted to analyze comprises the processor being adapted to analyze the plurality of motion vectors associated with a 16x16 block of pixels, wherein each of the motion vectors is associated with a sub-block of the 16x16 block of pixels.

105. The processor of claim 74, wherein:
the processor being adapted to analyze comprises the processor being adapted to analyze block information including a boundary of an image associated with a block of pixels in the interpolated frame, wherein some of the pixels of the block correspond to the boundary; and
the processor being adapted to adjust comprises the processor being adapted to associate a motion vector associated with the block of pixels only with pixels of the block that do not correspond to the boundary.

106. The processor of claim 105, wherein the processor being adapted to analyze comprises the processor being adapted to:
detect a boundary within a corresponding block of pixels in a reference frame; and
associate the boundary within the corresponding block of pixels in the reference frame to the boundary within the block of pixels of the interpolated frame.

107. The processor of claim 105, further comprising the processor being adapted to shift the motion vector associated with the block of pixels of the interpolated video frame.

108. The processor of claim 105, further comprising the processor being adapted to detect the boundary based on reconstructed pixel values.

109. The processor of claim 74, wherein:
the processor being adapted to analyze comprises the processor being adapted to compare a plurality of motion vectors of a region in the interpolated frame to a threshold magnitude, and
the processor being adapted to adjust comprises the processor being adapted to set the motion vectors of the region equal to zero if at least a majority of the motion vectors of the region are below the threshold.

110. The processor of claim 109, further comprising the processor being adapted to compute the threshold as a function of motion of the entire interpolated frame.

111. The processor of claim 109, further comprising the processor being adapted to group blocks of pixels that are adjacent to one another to form the region of the interpolated frame, wherein each of the blocks of pixels corresponds to one of the plurality of motion vectors.

112. The processor of claim 111, wherein the processor being adapted to group comprises the processor being adapted to group adjacent blocks of pixels that have substantially similar motion vectors.

113. The processor of claim 111, wherein the processor being adapted to group comprises the processor being adapted to group three blocks of pixels by three blocks of pixels to form the region, wherein each of the blocks of pixels is a 16x16 block of pixels.

114. The processor of claim 74, wherein:
the processor being adapted to analyze comprises the processor being adapted to compare a prediction mode associated with a block of pixels in the interpolated frame with a prediction mode associated with a region in the interpolated frame to which the block belongs, and
the processor being adapted to adjust comprises the processor being adapted to change the prediction mode associated with the block of pixels to the prediction mode of the region if the prediction mode associated with the block is different than the prediction mode of the region.

115. The processor of claim 114, further comprising the processor being adapted to analyze prediction modes associated with a plurality of blocks of pixels that form the region to determine the prediction mode of the region.

116. The processor of claim 115, wherein the processor being adapted to analyze comprises the processor being adapted to select the prediction mode associated with at least a majority of the blocks of pixels that form the region.

117. The processor of claim 114, further comprising the processor being adapted to maintain the prediction mode associated with the block of pixels if the prediction mode associated with the block of pixels is the same as the prediction mode of the region.

118. The processor of claim 114, wherein the prediction modes comprise one of intra prediction modes, forward prediction modes, backward prediction modes and bi-directional prediction modes.

119. The processor of claim 74, wherein the processor being adapted to adjust comprises the processor being adapted to adjust the block information in the interpolated frame to reduce shaking static background artifacts.

120. The processor of claim 74, wherein the processor being adapted to adjust comprises the processor being adapted to adjust the block information in the interpolated frame to reduce blocky artifacts.

* * * * *